US012157242B2

(12) United States Patent
Myrhum, Jr. et al.

(10) Patent No.: US 12,157,242 B2
(45) Date of Patent: Dec. 3, 2024

(54) HYDRAULIC HAND-HELD KNOCKOUT PUNCH DRIVER

(71) Applicant: Milwaukee Electric Tool Corporation, Brookfield, WI (US)

(72) Inventors: James O. Myrhum, Jr., West Bend, WI (US); Troy C. Thorson, Cedarburg, WI (US); Jeremy R. Ebner, Milwaukee, WI (US); Sean T. Kehoe, Hartland, WI (US); Joseph H. Ellice, Greenfield, WI (US); Jeffrey S. Holly, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 635 days.

(21) Appl. No.: 17/505,355

(22) Filed: Oct. 19, 2021

(65) Prior Publication Data

US 2022/0032486 A1 Feb. 3, 2022

Related U.S. Application Data

(60) Division of application No. 16/254,169, filed on Jan. 22, 2019, now Pat. No. 11,148,312, which is a (Continued)

(51) Int. Cl.
*B26D 5/12* (2006.01)
*B21D 28/00* (2006.01)
(Continued)

(52) U.S. Cl.
CPC ............. *B26D 5/12* (2013.01); *B21D 28/002* (2013.01); *B21D 28/343* (2013.01); (Continued)

(58) Field of Classification Search
CPC ...... B26F 1/02; B26F 1/34; B26F 1/36; B26F 1/38; B26F 1/386; B26F 2210/16; (Continued)

(56) References Cited

U.S. PATENT DOCUMENTS 1,372,915 A 3/1921 Smith
2,132,962 A 10/1938 Mueller
(Continued)

FOREIGN PATENT DOCUMENTS

DE 8333265 U1 8/1984
DE 3341861 A1 5/1985
(Continued)

OTHER PUBLICATIONS

International Search Report and Written Opinion for International Appln. No. PCT/US2014/061733 dated Jan. 28, 2015 (20 pages).
(Continued)

*Primary Examiner* — Scott A Smith
(74) *Attorney, Agent, or Firm* — Quarles & Brady LLP

(57) ABSTRACT

A hand-held knockout driver includes a main housing having a handle portion, a motor positioned within the main housing, a pump assembly driven by the motor, and a secondary housing coupled to the main housing and defining a bore therein. The hand-held knockout driver also includes a working piston moveable within the bore from a rest position to an actuated position to define a piston throw distance therebetween. The hand-held knockout driver also includes a draw stud coupled to the working piston, a die coupled to the secondary housing, and a punch coupled to the draw stud opposite the working piston for movement therewith relative to the die. The die has a depth greater than the piston throw distance.

10 Claims, 25 Drawing Sheets

Related U.S. Application Data division of application No. 14/921,474, filed on Oct. 23, 2015, now Pat. No. 10,195,755, which is a continuation of application No. 13/444,784, filed on Apr. 11, 2012, now Pat. No. 9,199,389.

(60) Provisional application No. 61/596,548, filed on Feb. 8, 2012, provisional application No. 61/523,691, filed on Aug. 15, 2011, provisional application No. 61/489,186, filed on May 23, 2011, provisional application No. 61/474,156, filed on Apr. 11, 2011.

(51) Int. Cl.

| | |
|---|---|
| ***B21D 28/34*** | (2006.01) |
| ***B25B 27/14*** | (2006.01) |
| ***B26F 1/34*** | (2006.01) |
| *B21D 28/24* | (2006.01) |
| *B21J 15/20* | (2006.01) |
| *B25B 7/12* | (2006.01) |
| *B25B 21/00* | (2006.01) |
| *B25B 23/00* | (2006.01) |
| *B25B 27/10* | (2006.01) |
| *B25D 16/00* | (2006.01) |
| *B25F 5/00* | (2006.01) |
| *B26F 1/38* | (2006.01) |
| *F15B 15/18* | (2006.01) |

(52) U.S. Cl.

CPC .............. *B25B 27/146* (2013.01); *B26F 1/34* (2013.01); *B21D 28/243* (2013.01); *B21J 15/20* (2013.01); *B25B 7/126* (2013.01); *B25B 21/005* (2013.01); *B25B 23/0035* (2013.01); *B25B 27/10* (2013.01); *B25D 16/00* (2013.01); *B25F 5/005* (2013.01); *B26F 1/386* (2013.01); *F15B 15/18* (2013.01)

(58) Field of Classification Search

CPC .......... B26D 5/08; B26D 5/12; B21D 28/002; B21D 28/24; B21D 28/243; B21D 28/34; B21D 28/343; B21D 28/345; B25B 7/12; B25B 7/126; B25B 21/005; B25B 23/0035; B25B 27/10; B25B 27/146; B25D 1/00; B25D 1/02; B25D 9/02; B25D 17/06; B25F 5/005; B25F 5/02; B21J 15/043; B21J 15/20; B21J 15/205; B21J 15/26

USPC ....... 173/128, 122, 114, 117, 217, 206, 201, 173/170, 203; 72/453.01, 453.03, 453.15, 72/453.16; 30/358, 360, 362, 391; 60/325, 477; 29/243.523, 243.524, 751

See application file for complete search history.

(56) References Cited

U.S. PATENT DOCUMENTS

| | | | |
|---|---|---|---|
| 2,254,613 | A | 9/1941 | Matthysse |
| 2,353,488 | A | 7/1944 | Mueller |
| 2,529,895 | A | 11/1950 | Anderson |
| 2,568,982 | A | 9/1951 | Mckay |
| 2,583,733 | A | 1/1952 | Fischer et al. |
| 2,782,855 | A | 2/1957 | Marcoux |
| 2,869,407 | A | 1/1959 | Swanson |
| 3,056,203 | A | 10/1962 | Calkins |
| 3,070,143 | A | 12/1962 | Klinger |
| 3,105,299 | A | 10/1963 | Wirtanen |
| 3,114,391 | A | 12/1963 | Kurtz |
| 3,255,526 | A | 6/1966 | Molitor |
| 3,269,011 | A | 8/1966 | Herrstrum |
| 3,296,905 | A | 1/1967 | Killaly |
| 3,344,519 | A | 10/1967 | Goodman |
| 3,380,160 | A | 4/1968 | Kirschberger et al. |
| 3,425,219 | A | 2/1969 | Morris |
| 3,564,716 | A | 2/1971 | Burrows |
| 3,574,374 | A | 4/1971 | Keller |
| 3,602,103 | A | 8/1971 | Powers |
| 3,648,967 | A | 3/1972 | Smiley |
| 3,706,245 | A | 12/1972 | Van Schaik |
| 3,728,927 | A | 4/1973 | Pfleiderer et al. |
| 3,732,026 | A | 5/1973 | Peters |
| 3,877,280 | A | 4/1975 | Cornell et al. |
| 3,924,330 | A | 12/1975 | Mitsuhashi et al. |
| 3,972,218 | A | 8/1976 | Pawloski |
| 4,010,630 | A | 3/1977 | Davis, Jr. et al. |
| 4,030,336 | A | 6/1977 | Grigorenko et al. |
| 4,031,619 | A | 6/1977 | Gregory |
| 4,082,104 | A | 4/1978 | Keeney |
| 4,086,802 | A | 5/1978 | Ewig |
| 4,094,965 | A | 6/1978 | Wanner |
| 4,132,107 | A | 1/1979 | Suganuma et al. |
| 4,149,381 | A | 4/1979 | Mekler |
| 4,226,110 | A | 10/1980 | Suganuma |
| 4,239,058 | A | 12/1980 | Peters |
| 4,276,941 | A | 7/1981 | Wanner et al. |
| 4,292,833 | A | 10/1981 | Lapp |
| 4,305,423 | A | 12/1981 | Adler |
| 4,321,021 | A | 3/1982 | Pauliukonis |
| 4,334,667 | A | 6/1982 | Fox |
| 1,342,216 | A | 8/1982 | Gregory |
| 4,380,871 | A | 4/1983 | Adleman |
| 4,382,331 | A | 5/1983 | Kimura |
| 4,497,197 | A | 2/1985 | Giardino et al. |
| 4,567,951 | A | 2/1986 | Fehrle et al. |
| 4,571,975 | A | 2/1986 | Pawloski et al. |
| 4,581,894 | A | 4/1986 | Bush et al. |
| 4,597,263 | A | 7/1986 | Corbett et al. |
| 4,609,053 | A | 9/1986 | Ragnmark |
| 4,667,411 | A | 5/1987 | McCallum |
| 4,689,957 | A | 9/1987 | Gallentine |
| 4,694,671 | A | 9/1987 | Downham |
| 4,703,623 | A | 11/1987 | Dalibout et al. |
| 4,766,750 | A | 8/1988 | Brinkman |
| 4,793,063 | A | 12/1988 | Ducret |
| 4,796,461 | A | 1/1989 | Mead |
| 4,844,114 | A | 7/1989 | Moberg et al. |
| 4,879,875 | A | 11/1989 | Davert et al. |
| 4,901,427 | A | 2/1990 | Sakamoto et al. |
| 4,909,061 | A | 3/1990 | Reitter et al. |
| 4,922,615 | A | 5/1990 | Nishida |
| 4,932,479 | A | 6/1990 | Pyatov |
| 4,942,757 | A | 7/1990 | Pecora |
| D310,009 | S | 8/1990 | Freiwald |
| 4,947,672 | A | 8/1990 | Pecora |
| 4,957,021 | A | 9/1990 | Helton |
| 4,998,351 | A | 3/1991 | Hartmeister |
| 5,111,681 | A | 5/1992 | Yasui et al. |
| 5,150,644 | A | 9/1992 | Kimura |
| 5,159,872 | A | 11/1992 | Dettmers et al. |
| 5,195,354 | A | 3/1993 | Yasui et al. |
| 5,209,153 | A | 5/1993 | Araki |
| 5,233,749 | A | 8/1993 | Saito |
| 5,240,077 | A | 8/1993 | Whitsitt |
| 5,243,761 | A | 9/1993 | Sullivan et al. |
| 5,251,445 | A | 10/1993 | Farell |
| 5,255,712 | A | 10/1993 | Foster |
| 5,282,378 | A | 2/1994 | Kimura |
| 5,291,919 | A | 3/1994 | Calzavara |
| 5,365,736 | A | 11/1994 | Yamamoto |
| 5,375,638 | A | 12/1994 | Green |
| 5,394,693 | A | 3/1995 | Plyter |
| 5,398,594 | A | 3/1995 | Tischer et al. |
| 5,416,975 | A | 5/1995 | Saito et al. |
| 5,425,164 | A | 6/1995 | El Dessouky |
| 5,474,242 | A | 12/1995 | Rafn |
| 5,477,680 | A | 12/1995 | Heskey et al. |
| 5,513,492 | A | 5/1996 | Anderson |
| 5,556,075 | A | 9/1996 | Weber |
| 5,598,635 | A | 2/1997 | Saito |
| 5,598,737 | A | 2/1997 | Oide |

(56) References Cited

U.S. PATENT DOCUMENTS

| | | | |
|---|---|---|---|
| 5,630,277 | A | 5/1997 | Kimura |
| 5,647,212 | A | 7/1997 | Coleman |
| 5,666,848 | A | 9/1997 | Burns |
| 5,727,417 | A | 3/1998 | Moffatt et al. |
| 5,732,737 | A | 3/1998 | Condon |
| 5,744,934 | A | 4/1998 | Wu |
| 5,775,104 | A | 7/1998 | Gardner |
| 5,775,440 | A | 7/1998 | Shinma et al. |
| 5,802,850 | A | 9/1998 | Kimura |
| 5,875,629 | A | 3/1999 | Kimura |
| 5,974,926 | A | 11/1999 | Kimura |
| 5,988,989 | A | 11/1999 | Hobson |
| 6,029,448 | A | 2/2000 | Hobson |
| 6,035,634 | A | 3/2000 | Tupper et al. |
| 6,065,326 | A | 5/2000 | Frenken |
| 6,126,418 | A | 10/2000 | Sinnl |
| 6,179,063 | B1 | 1/2001 | Borries et al. |
| 6,206,663 | B1 | 3/2001 | Frenken |
| 6,230,542 | B1 | 5/2001 | Frenken |
| 6,266,886 | B1 | 7/2001 | Tandart |
| 6,276,186 | B1 | 8/2001 | Frenken |
| 6,321,854 | B1 | 11/2001 | Bisutti |
| 6,341,950 | B1 | 1/2002 | Schuller et al. |
| 6,367,362 | B1 | 4/2002 | Brazell et al. |
| 6,378,217 | B1 | 4/2002 | Takamura et al. |
| 6,401,345 | B1 | 6/2002 | Liaw |
| 6,401,515 | B2 | 6/2002 | Frenken |
| 6,446,482 | B1 | 9/2002 | Heskey et al. |
| 6,453,719 | B1 | 9/2002 | Heskey et al. |
| 6,463,778 | B1 | 10/2002 | Johnston |
| 6,510,719 | B2 | 1/2003 | Goop |
| 6,532,635 | B1 | 3/2003 | Gregory |
| 6,532,790 | B2 | 3/2003 | Frenken |
| 6,564,610 | B2 | 5/2003 | Lefavour et al. |
| 6,622,601 | B2 | 9/2003 | Hashimoto et al. |
| 6,647,630 | B1 | 11/2003 | Lucas et al. |
| 6,666,064 | B2 | 12/2003 | LeFavour et al. |
| 6,668,613 | B2 | 12/2003 | LeFavour et al. |
| 6,685,056 | B1 | 2/2004 | Argentieri et al. |
| 6,698,324 | B2 | 3/2004 | Hashimoto et al. |
| 6,712,726 | B1 | 3/2004 | Jackson et al. |
| 6,766,644 | B2 | 7/2004 | Vermoesen et al. |
| 6,769,656 | B1 | 8/2004 | Frenken |
| 6,772,521 | B2 | 8/2004 | Nordlin et al. |
| 6,789,389 | B2 | 9/2004 | Nakano |
| 6,820,339 | B2 | 11/2004 | Albrightson |
| 6,826,908 | B1 | 12/2004 | Stafford |
| 6,843,330 | B2 | 1/2005 | Schmid et al. |
| 6,938,705 | B2 | 9/2005 | Kikuchi |
| 6,973,978 | B2 | 12/2005 | Cravatte |
| 6,986,274 | B2 | 1/2006 | Lefavour |
| 6,990,888 | B2 | 1/2006 | Hanvath et al. |
| 7,004,186 | B2 | 2/2006 | Ferrel |
| 7,059,337 | B2 | 6/2006 | Ball, Jr. et al. |
| 7,086,979 | B2 | 8/2006 | Frenken |
| 7,156,190 | B2 | 1/2007 | Ottestad et al. |
| 7,251,980 | B2 | 8/2007 | Gallentine et al. |
| 7,254,982 | B2 | 8/2007 | Frenken |
| 7,263,831 | B2 | 9/2007 | Sawdon et al. |
| 7,331,408 | B2 | 2/2008 | Arich et al. |
| 7,337,514 | B2 | 3/2008 | McKay |
| 7,351,176 | B1 | 4/2008 | Stafford |
| 7,412,868 | B2 | 8/2008 | Frenken |
| 7,421,844 | B2 | 9/2008 | Griffin et al. |
| 7,428,812 | B2 | 9/2008 | Montminy et al. |
| 7,444,813 | B1 | 11/2008 | Barvosa-Carter |
| 7,533,556 | B2 | 5/2009 | Lefavour et al. |
| 7,568,372 | B1 | 8/2009 | Patton et al. |
| 7,596,872 | B2 | 10/2009 | Clarke et al. |
| 7,661,336 | B2 | 2/2010 | Hohmann et al. |
| 7,673,705 | B2 | 3/2010 | Gearhart et al. |
| 7,694,692 | B2 | 4/2010 | Hansson et al. |
| 7,705,497 | B2 | 4/2010 | Arich et al. |
| 7,739,871 | B2 | 6/2010 | Cotter et al. |
| 7,797,840 | B2 | 9/2010 | Bublitz et al. |
| 7,895,837 | B2 | 3/2011 | Bass |
| 7,908,963 | B2 | 3/2011 | Frenken |
| D642,889 | S | 8/2011 | Boehm et al. |
| 7,997,456 | B2 | 8/2011 | Shew |
| 8,056,473 | B2 | 11/2011 | Frenken |
| 8,276,430 | B2 | 10/2012 | Barezzani et al. |
| 8,307,690 | B2 | 11/2012 | Cobzaru |
| 8,695,725 | B2 | 4/2014 | Lau et al. |
| 9,016,317 | B2 | 4/2015 | Myrhum, Jr. |
| 9,199,389 | B2 | 12/2015 | Myrhum, Jr. |
| 10,195,755 | B2 | 2/2019 | Myrhum, Jr. et al. |
| 10,226,826 | B2 * | 3/2019 | Kehoe ..................... B25B 7/126 |
| 10,688,646 | B2 * | 6/2020 | Frenken .................. B25B 27/10 |
| 11,148,312 | B2 * | 10/2021 | Myrhum, Jr. ............ B26D 5/12 |
| 2002/0002775 | A1 | 1/2002 | Kimura |
| 2004/0113487 | A1 | 6/2004 | Yang |
| 2005/0005672 | A1 | 1/2005 | Sneath |
| 2005/0276658 | A1 | 12/2005 | Silva |
| 2007/0034262 | A1 | 2/2007 | Cozens et al. |
| 2007/0180887 | A1 | 8/2007 | Frenken |
| 2007/0214860 | A1 | 9/2007 | Frenken |
| 2008/0087144 | A1 | 4/2008 | Rollins et al. |
| 2008/0210076 | A1 | 9/2008 | Bublitz |
| 2008/0216543 | A1 | 9/2008 | Hamm et al. |
| 2010/0000288 | A1 | 1/2010 | Barezzani et al. |
| 2010/0000425 | A1 | 1/2010 | Schweizer |
| 2010/0107864 | A1 | 5/2010 | Bushner |
| 2010/0132350 | A1 | 6/2010 | Hirai |
| 2010/0257713 | A1 | 10/2010 | Gregory |
| 2010/0258604 | A1 | 10/2010 | Mullner et al. |
| 2010/0300308 | A1 | 12/2010 | Frenken |
| 2010/0307010 | A1 | 12/2010 | Patton et al. |
| 2011/0048099 | A1 | 3/2011 | Cobzaru |
| 2011/0203425 | A1 | 8/2011 | Riestra |
| 2011/0247506 | A1 | 10/2011 | Frenken |
| 2011/0315940 | A1 | 12/2011 | Zhong et al. |
| 2012/0160065 | A1 | 6/2012 | Frenken |
| 2013/0206022 | A1 | 8/2013 | Bungter |

FOREIGN PATENT DOCUMENTS

| | | | |
|---|---|---|---|
| DE | 9104064 | U1 | 11/1991 |
| DE | 19949797 | A1 | 11/2000 |
| EP | 0759341 | A2 | 2/1997 |
| GB | 2297509 | A | 8/1996 |

OTHER PUBLICATIONS

Battery Punch Drive—120 volt charger with 2 Draw Studs, 1 Adapter and 1 Spacer-LS6OL, Greenlee Products, 2010 (2 pages).

Operation Manual Gate LS6OL Battery-powered Punch Driver with Auto Return, Greenlee Products, Feb. 2011 (16 pages).

Punching Tool Kit with Slugbuster Punches and Dies—LS5OL, Greenlee Products, 2010 (1 page).

Instruction Manual for Greenlee Knockout Punch Driver-LS 60 Plus, Greenlee Products, 1997, pp. 1-3 and 15-24.

Instruction Manual for Gator LS60 Battery-Powered Punch Driver, Greenlee Products, Apr. 1998 (24 pages).

Holemaking Product Guide, Greenlee, available at least as early as Mar. 2011, pp. 41, 44, 48, 57-66 and 76-77.

International Search Report and Written Opinion for International Appln. No. PCT/US2012/033161 dated Jan. 21, 2013 (8 pages).

* cited by examiner

HYDRAULIC HAND-HELD KNOCKOUT PUNCH DRIVER

RELATED APPLICATIONS

The present application is a divisional of U.S. patent application Ser. No. 16/254,169, filed on Jan. 22, 2019 now U.S. Pat. No. 11,148,312, which is a continuation of U.S. patent application Ser. No. 14/921,474, filed Oct. 23, 2015, now U.S. Pat. No. 10,195,755, which is a continuation of U.S. patent application Ser. No. 13/444,784, filed Apr. 11, 2012, now U.S. Pat. No. 9,199,389, which claims the benefit of and priority to U.S. Provisional Patent Application No. 61/596,548, filed Feb. 8, 2012, U.S. Provisional Patent Application No. 61/523,691, filed Aug. 15, 2011, U.S. Provisional Patent Application No. 61/489,186, filed May 23, 2011, and U.S. Provisional Patent Application No. 61/474,156, filed Apr. 11, 2011, each of which is incorporated herein by reference in its entirety.

BACKGROUND

The present invention relates to knockout punches and, more particularly, to powered knockout drivers.

A knockout driver is generally used in combination with a punch and die set to form apertures within sheet material, such as sheet metal and the like. The punching process is accomplished by providing a large force between the die and punch, causing the punch to pierce the sheet material and form the desired aperture. The force can be produced in a number of ways, such as manually, hydraulically, and the like. Typically, manual embodiments are limited by the size of hole they can create, while most hydraulic powered systems can be bulky.

SUMMARY OF THE INVENTION

The invention provides, in one aspect, a hand-held knockout driver including a main housing having a handle portion, a motor positioned within the main housing, a hydraulic assembly driven by the motor and including a reservoir containing hydraulic fluid, a secondary housing coupled to the main housing and defining a bore therein, a working piston moveable within the bore between a rest position and an actuated position, and a work zone defined between the secondary housing and the working piston into which pressurized hydraulic fluid discharged from the hydraulic assembly is received. One unit of fluid is added to the work zone to move the working piston from the rest position to the actuated position. The reservoir has a fill capacity no greater than about 1.5 units of fluid.

The invention provides, in another aspect, a hand-held knockout driver including a main housing having a handle portion, a motor positioned within the main housing, a pump assembly driven by the motor, a secondary housing coupled to the main housing and defining a bore therein, a working piston moveable within the bore from a rest position to an actuated position to define a piston throw distance therebetween, a draw stud coupled to the working piston, and one of a punch or a die coupled to the draw stud opposite the working piston for movement therewith. The die includes a depth greater than the piston throw distance.

The invention provides, in yet another aspect, a hand-held knockout driver including a housing having a handle portion, a head unit defining a first hydraulic channel, a pump body coupled to the head unit, the pump body defining a second hydraulic channel therein, and an insert having a first end sized to be at least partially received within and form a seal with the first hydraulic channel and a second end sized to be at least partially received within and form a seal with the second hydraulic channel.

The invention provides, in a further aspect, a hand-held knockout driver including a housing having a handle portion, a motor positioned within the housing, a pump body positioned within the housing and defining a recess therein, and a dump valve positioned within the recess and having a seat, a piston, a plunger, and a return spring. The seat includes a side wall defining an output aperture. The side wall is spaced a distance radially inwardly from the interior of the recess.

DETAILED DESCRIPTION OF THE INVENTION

Figure 1:
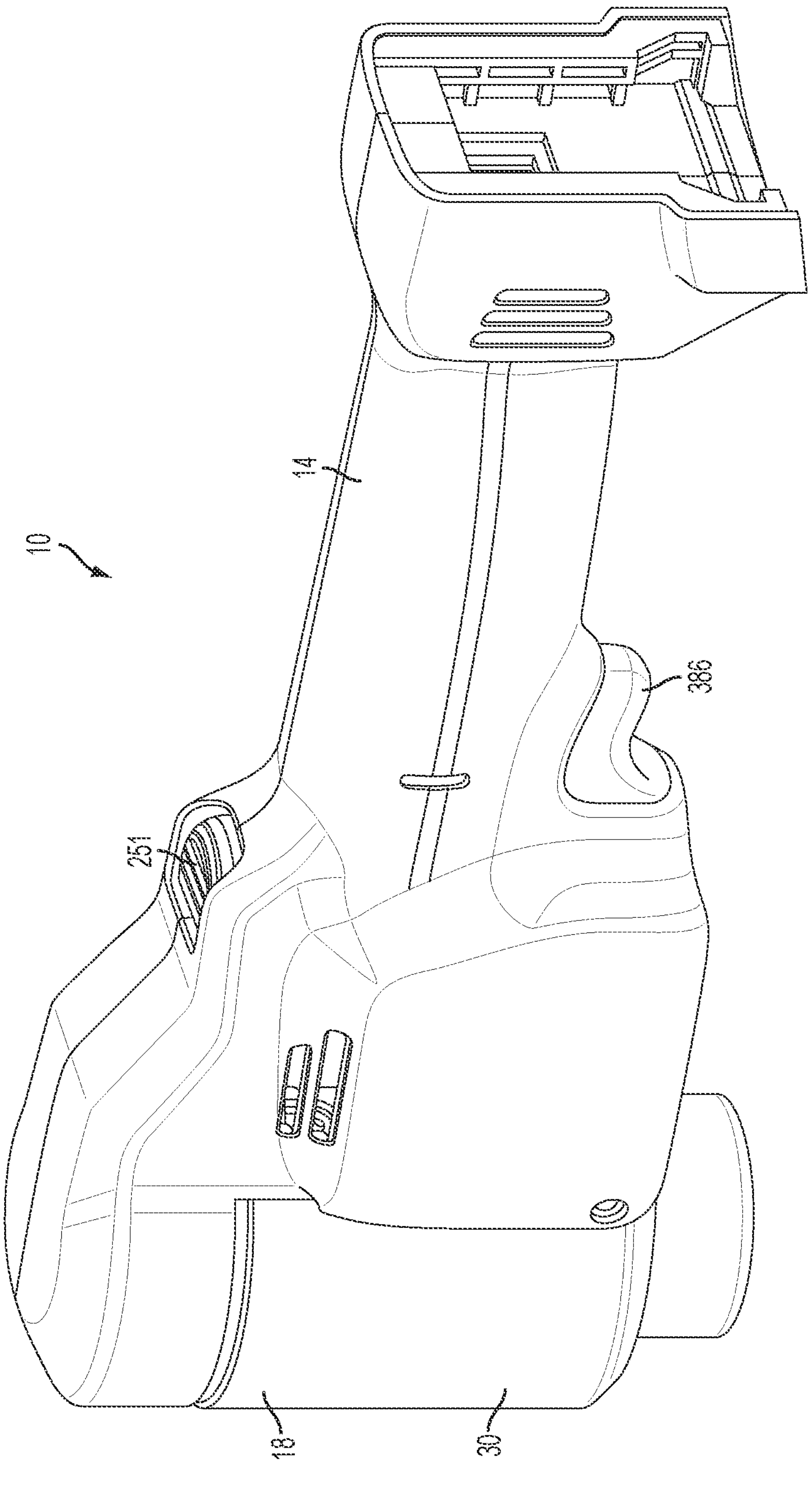
FIG. 1 is a perspective view of a knockout driver according to an embodiment of the invention.
Figure 2:
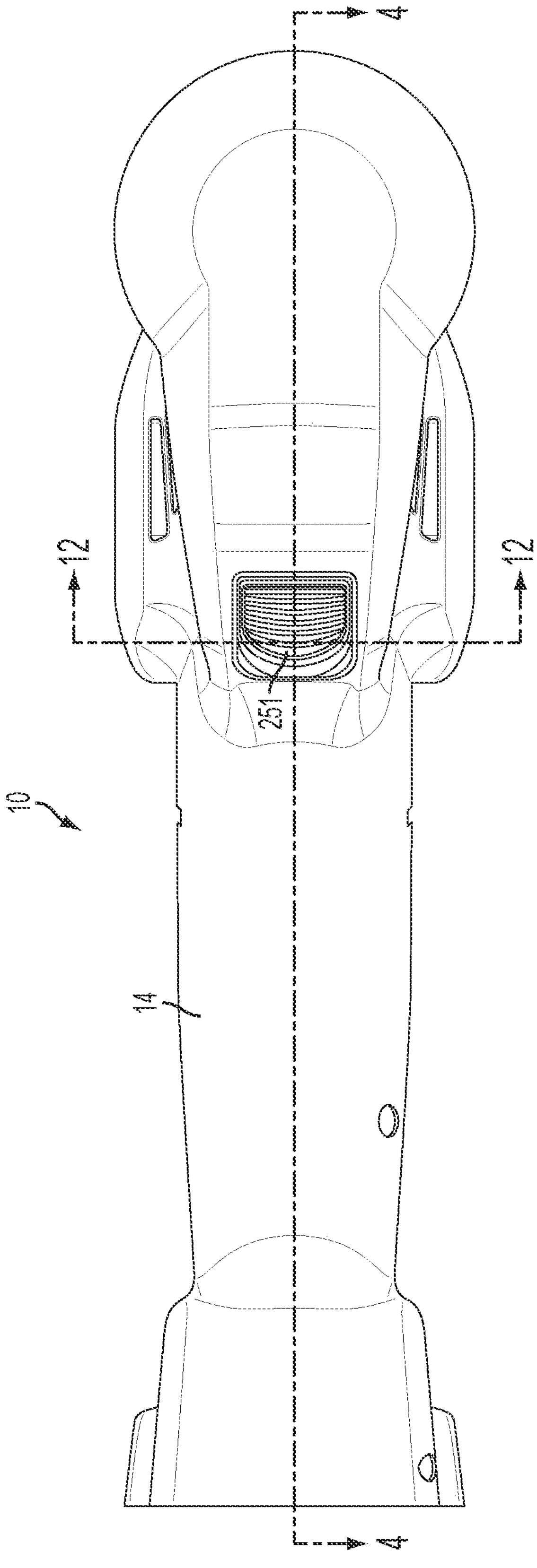
FIG. 2 is a top view of the knockout driver shown in FIG. 1.
Figure 3:
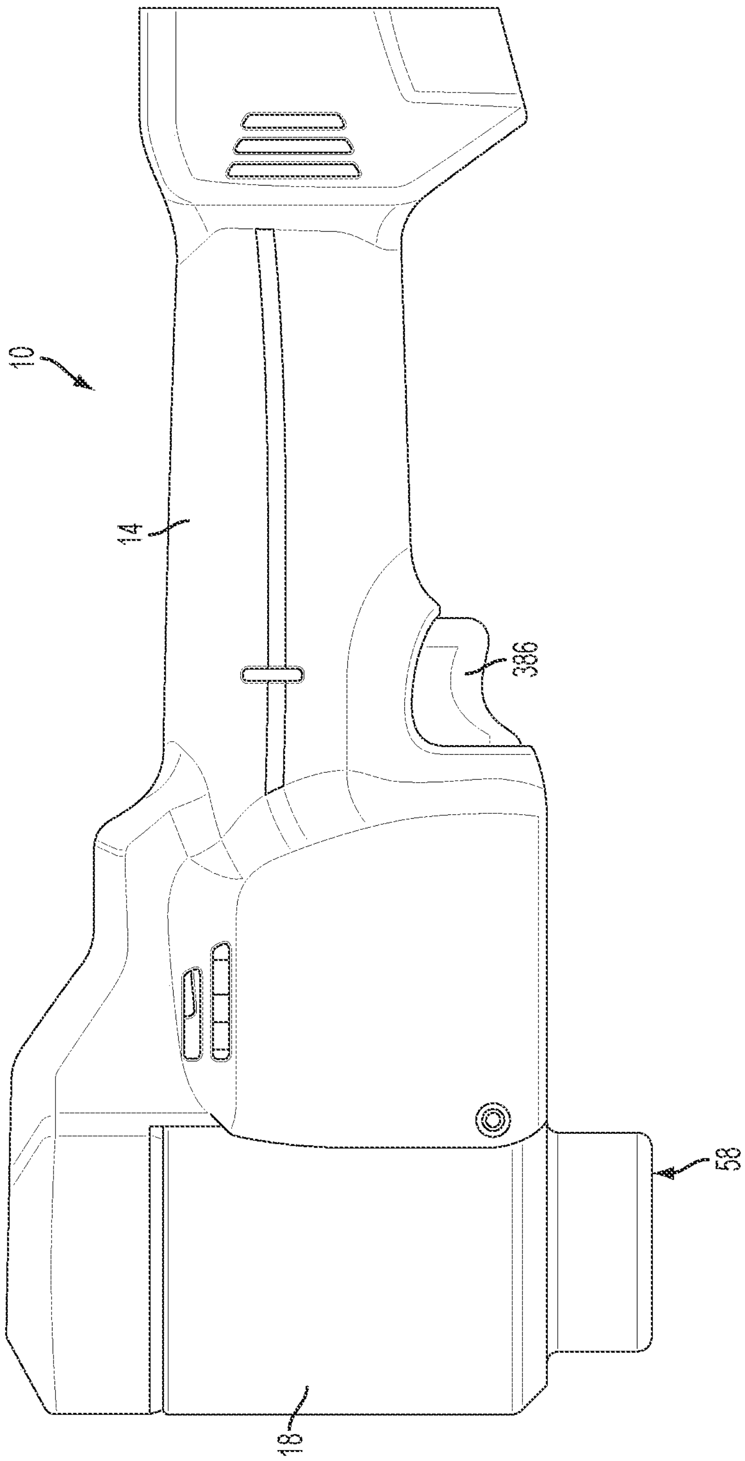
FIG. 3 is a side view of the knockout driver shown in FIG. 1.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1-13 illustrate an electrically powered, hydraulically driven knockout driver 10 according to an embodiment of the invention, which is used in conjunction with a punch and die set to form apertures in sheet material (e.g., sheet metal and the like). The driver 10 includes a main housing 14 having a handle portion, a head unit 18, and a hydraulic assembly 22 containing a reciprocating, positive displacement pump driven by a motor 26.

Although the illustrated embodiment utilizes a DC electric motor 26 powered by an 18 volt rechargeable battery 15, in another embodiment, the driver 10 may be powered by a battery having a greater or lesser voltage or may include a power cord to be plugged into a power outlet. In still another embodiment, a pneumatic motor may be utilized.

Referring to FIGS. 4-7, the head unit 18 of the punch driver 10 includes a generally cylindrical housing 30 defining a central axis 34 and a bore 38, which is co-axial with the axis 34 and extends through the housing 30. The bore 38 includes a first portion 42 extending axially inwardly from the top of the housing 30 to define a first diameter, a second portion 46 extending axially from the bottom of the first portion 42 to form a second diameter, and a third portion 50 forming a third diameter. The housing 30 also includes a cylindrical protrusion or foot 54, extending axially from the bottom of the housing 30 to provide a contact surface 58.

Figure 5:
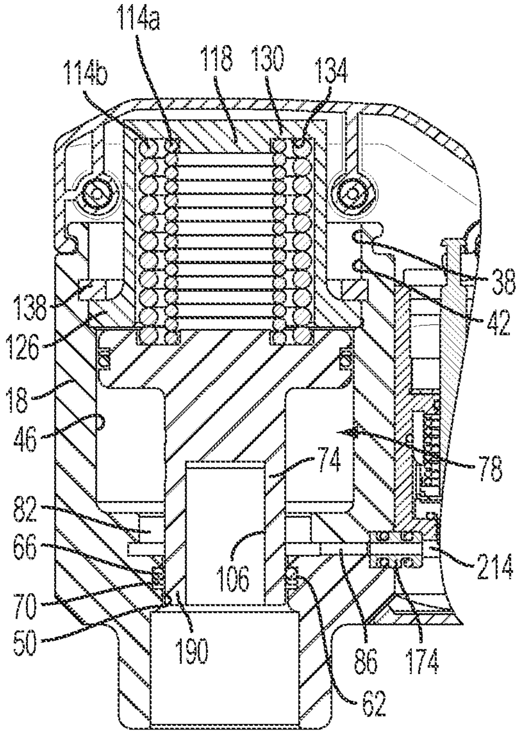
FIG. 5 is the section view of FIG. 4 showing a working piston in the actuated position.

The third portion 50 of the bore 38 includes a seal groove 62 extending circumferentially thereabout. The seal groove 62 is sized to receive an O-ring 66 and a back-up ring 70 therein (FIG. 5). When assembled, the O-ring 66 creates a seal with the outer surface of a piston 74 (described below) to create the lowermost boundary of a work zone 78.

The bore 38 also includes an intermediate portion 82 extending between the second portion 46 and the third portion 50. When assembled, the walls of the intermediate portion 82 are spaced a distance from the piston 74 to provide clearance for the hydraulic fluid to enter the work zone 78.

The head unit 18 also includes a hydraulic channel 86 extending between the outside of the housing 30 and the intermediate portion 82 (e.g., the work zone 78) of the bore 38. When assembled, the channel 86 is configured to allow fluid to flow between the work zone 78 and an outlet 198 of a pump 182 (described below).

The head unit 18 also includes the piston 74, positioned and axially moveable within the bore 38 of the housing 30 along the axis 34. The piston 74 is movable between a rest position, where a bottom 90 of the piston 74 is proximate the contact surface 58 of the housing 30 (FIG. 4), and an actuated position, where the piston 74 is retracted into the bore 38 (FIG. 5). The axial distance the piston 74 moves between the rest and actuated positions is defined as the piston throw distance PT (FIGS. 13 and 14).

In the illustrated embodiment, the piston 74 is substantially cylindrical in shape and includes a bottom portion 94, which has a first outer diameter substantially corresponding to the third portion 50 of the bore 38, and a flange 98 extending radially outwardly from the bottom portion 94, which has a second outer diameter substantially corresponding to the second portion 46 of the bore 38.

Figure 4:
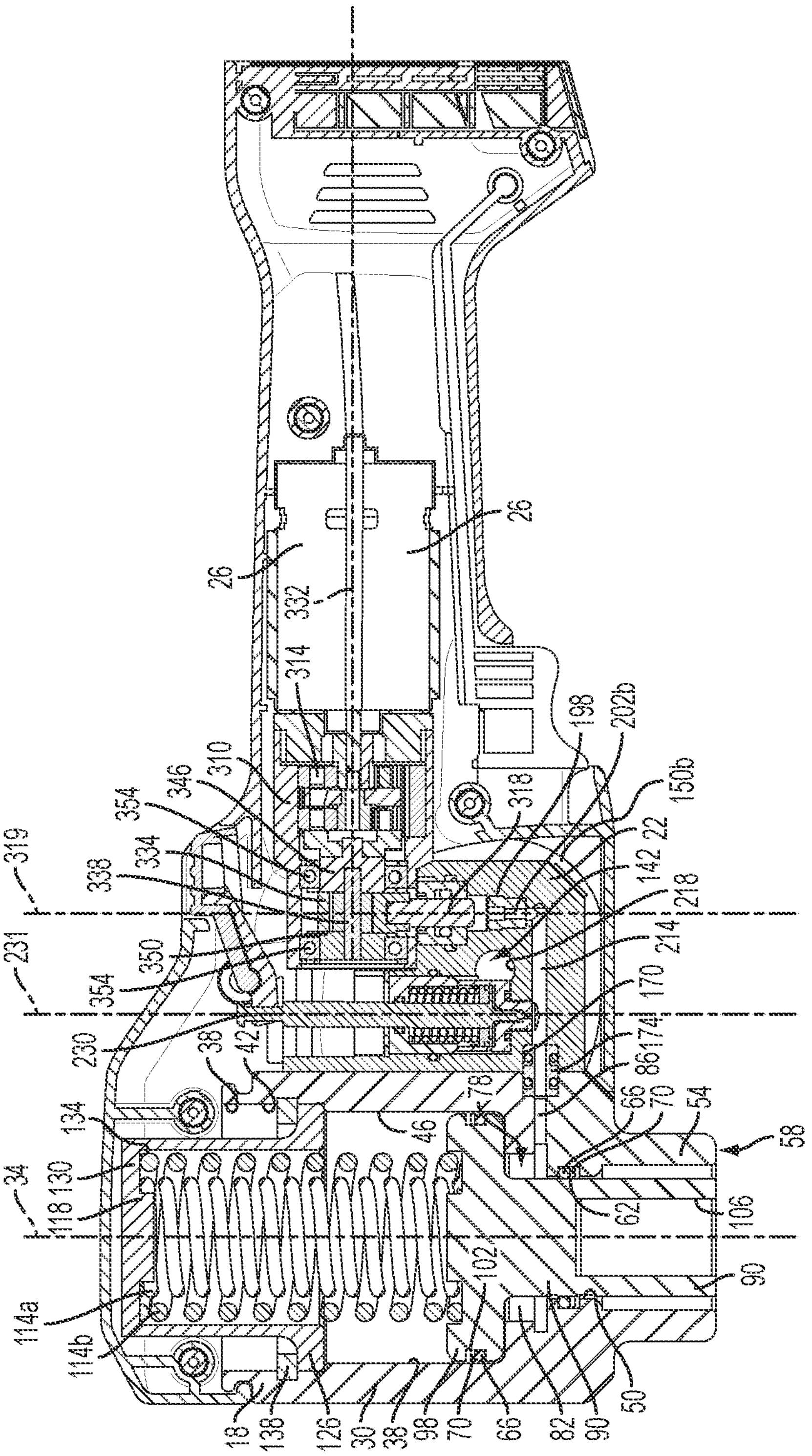
FIG. 4 is a section view taken along lines 4-4 of FIG. 2.

The piston 74 includes a seal groove 102 extending circumferentially around the flange 98 that is sized to receive an O-ring 66 and a back-up ring 70 therein (FIG. 4). In the illustrated embodiment, the O-ring 66 creates a seal with the wall of the second portion 46 of the bore 38 creating the uppermost boundary of the work zone 78. When assembled, the O-ring 66 in the seal groove 70 and the O-ring 66 in the seal groove 62, at least partially create the hydraulic boundaries of the work zone 78.

Figure 13:
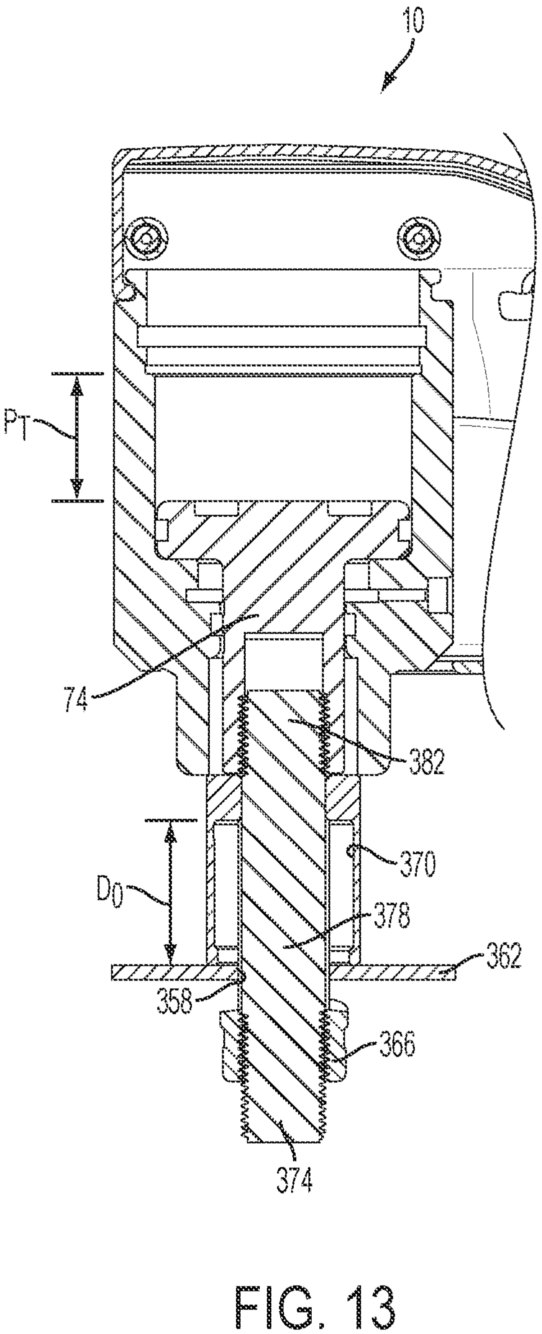
FIG. 13 is a section view of a knockout driver of FIG. 4 with the piston in a rested position and a draw stud, punch, and die attached.
Figure 14:
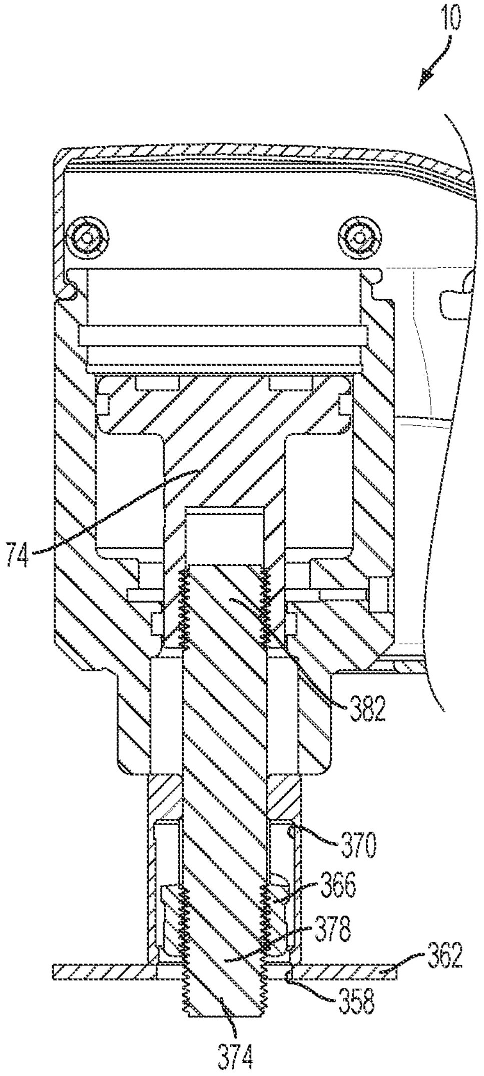
FIG. 14 is a section view of the knockout driver shown in FIG. 13, with the piston in an activated position.

The piston 74 also includes a recess 106, extending axially inward from the bottom 90 that is configured to receive a portion of a draw rod 378 therein (FIGS. 13 and 14). In the illustrated embodiment, the recess 106 is threaded, although in other embodiments, a pin or other type of coupling may be utilized to couple the draw rod 378 and the piston 74.

The piston 74 also includes a spring seat 110 formed in the upper surface of the piston 74. When assembled, the spring seat 110 positions a return spring 114 on the piston 74. Dependent upon the size, orientation, and number of return springs present, one or more seats 110 may be used.

Figure 7:
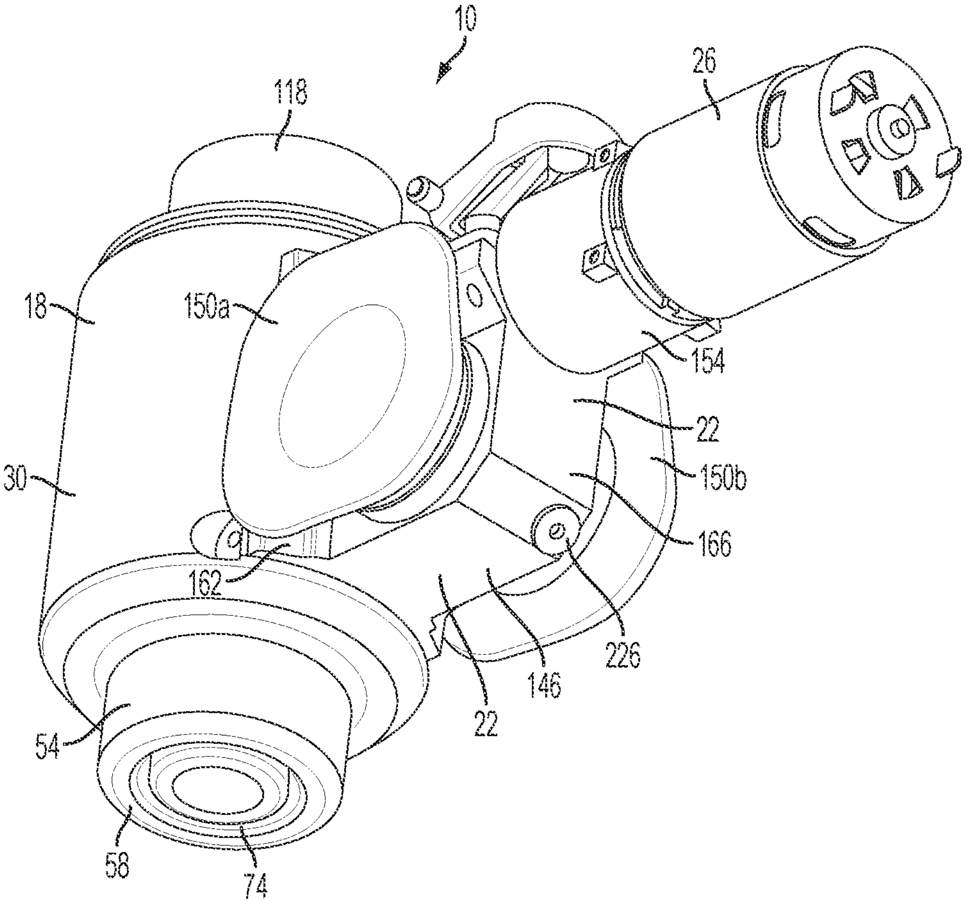
FIG. 7 is a bottom perspective view of the knockout drive of FIG. 1 with the housing removed for clarity.
Figure 8:
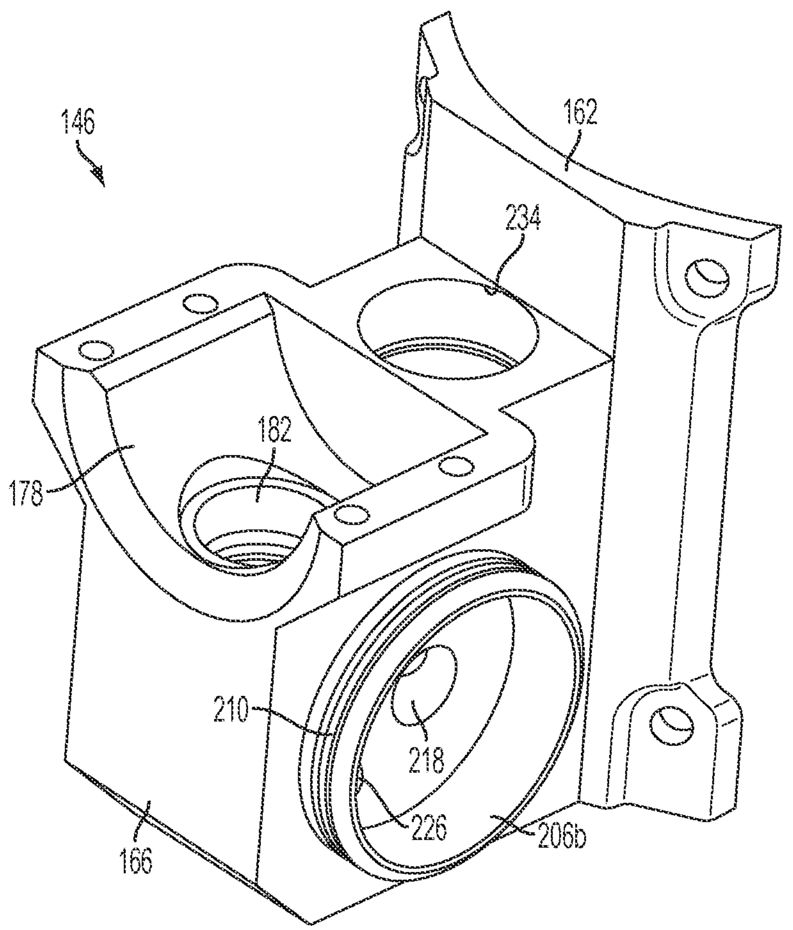
FIGS. 8 and 9 illustrate a hydraulic body of the knockout driver.
Figure 9:
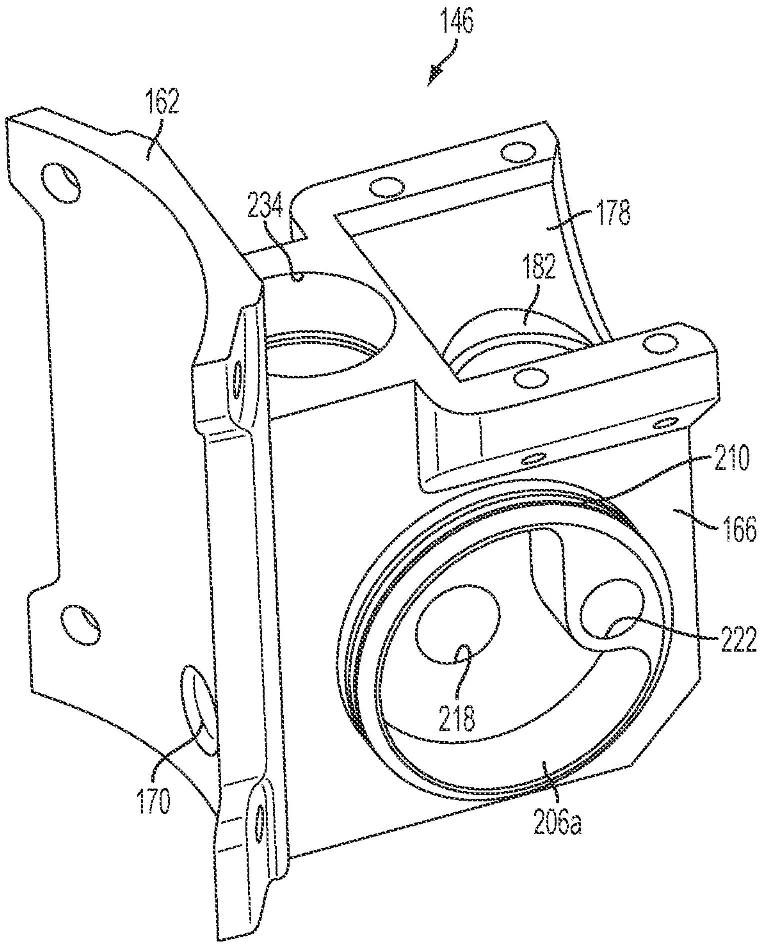

The head unit 18 also includes the retainer cup 118 coupled to the top of the housing 30 and configured to position the return spring 114 substantially co-axial with the central axis 34 (FIG. 7). The retainer cup 118 includes a substantially cylindrical outer wall 122, a flange 126 extending radially outwardly from one end of the annular wall 122, and a top wall 130 opposite the flange 126 in contact with the return spring 114. The retainer cup 118 also includes at least one spring seat 134 to position the return spring 114. When assembled, the flange 126 of the retainer cup 118 is axially received within the first portion 42 of the bore 38 and secured by one or more locking rings 138.

Figure 16:
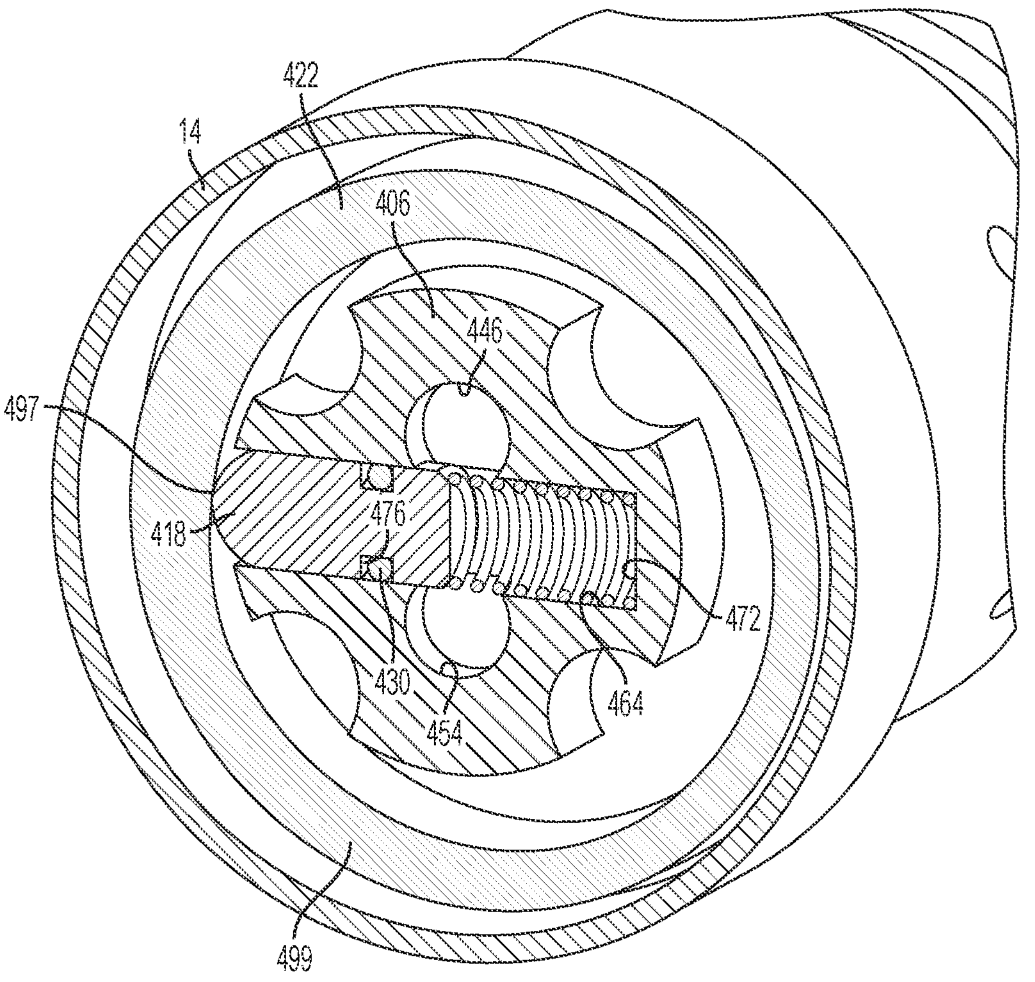
FIG. 16 is a section view taken along line 16-16 of FIG. 15.

In the illustrated embodiment, the return spring 114 extends between the piston 74 and the retainer cup 118 to bias the piston 74 toward the rest position. The return spring 114 provides sufficient force to bias the piston 74 toward the rest position when fluid is free to flow between the work zone 78 and the reservoir 142 (e.g., a dump valve 230 is open), but does not provide enough force to unseat the dump valve 230 by itself. In the illustrated embodiment, a pair of concentric return springs 114 *a*, 114 *b*, each formed from circular wire, may be used (FIG. 16).

The driver 10 also includes a hydraulic assembly 22. The hydraulic assembly 22 includes a hydraulic body 146, first and second reservoir bladders 150 *a*, 150 *b* coupled to the hydraulic body 146, and a pump assembly 154. During operation, the hydraulic assembly 22 provides hydraulic fluid, under pressure, to the head unit 18 to bias the piston 74 toward the actuated position.

Illustrated in FIGS. 4-9, the hydraulic body 146 is coupled to the head unit 18 by a plurality of fasteners 158. The hydraulic body 146 includes mounting plate 162 curved to match the outer contour of the housing 30 and a hydraulic block 166 extending from the plate 162. In the illustrated embodiment, the mounting plate 162 defines a hydraulic aperture 170 positioned to align with the hydraulic channel 86 of the head unit 18.

In the illustrated embodiment, the seal between the channel 86 and the aperture 170 is formed from a seal member 174. The seal member 174 is substantially cylindrical in shape having a fluid passage extending therethrough. The seal member 174 also includes a pair of O-rings, to seal with the interior surfaces of the channel 86 and aperture 170. In other embodiments, other forms of sealing may be used.

The hydraulic block 166 defines a substantially semi-cylindrical recess 178 (FIG. 8) and a piston cylinder 182 extending into the block 166 from the bottom of the recess 178 to produce a distal end 186. In the illustrated embodiment, the piston cylinder 182 is sized to receive a substantially cylindrical sleeve 190 therein. When assembled, the sleeve 190 is sized such that it forms a seal with an outside wall of the piston cylinder 182 while also forming a seal with an inside wall of a pump piston 318. In the illustrated embodiment, the sleeve 190 can be removed and/or replaced with another sleeve when the sleeve 190 becomes worn out. Furthermore, the sleeve 190 can be replaced with a sleeve having different interior dimensions to modify the output capacity of the pump assembly 154 (assuming a corresponding change in piston size). In some embodiments, the sleeve 190 also allows the user to create the hydraulic block 166 out of softer materials, such as aluminum, while minimizing wear by forming the sleeve from a harder material such as steel. In the present invention, the sleeve 190 is retained within the recess 178 by a snap-ring, however in alternate embodiments; the sleeve 190 may be pressed (forming an interference fit) or threaded into the recess 178.

Figure 12:
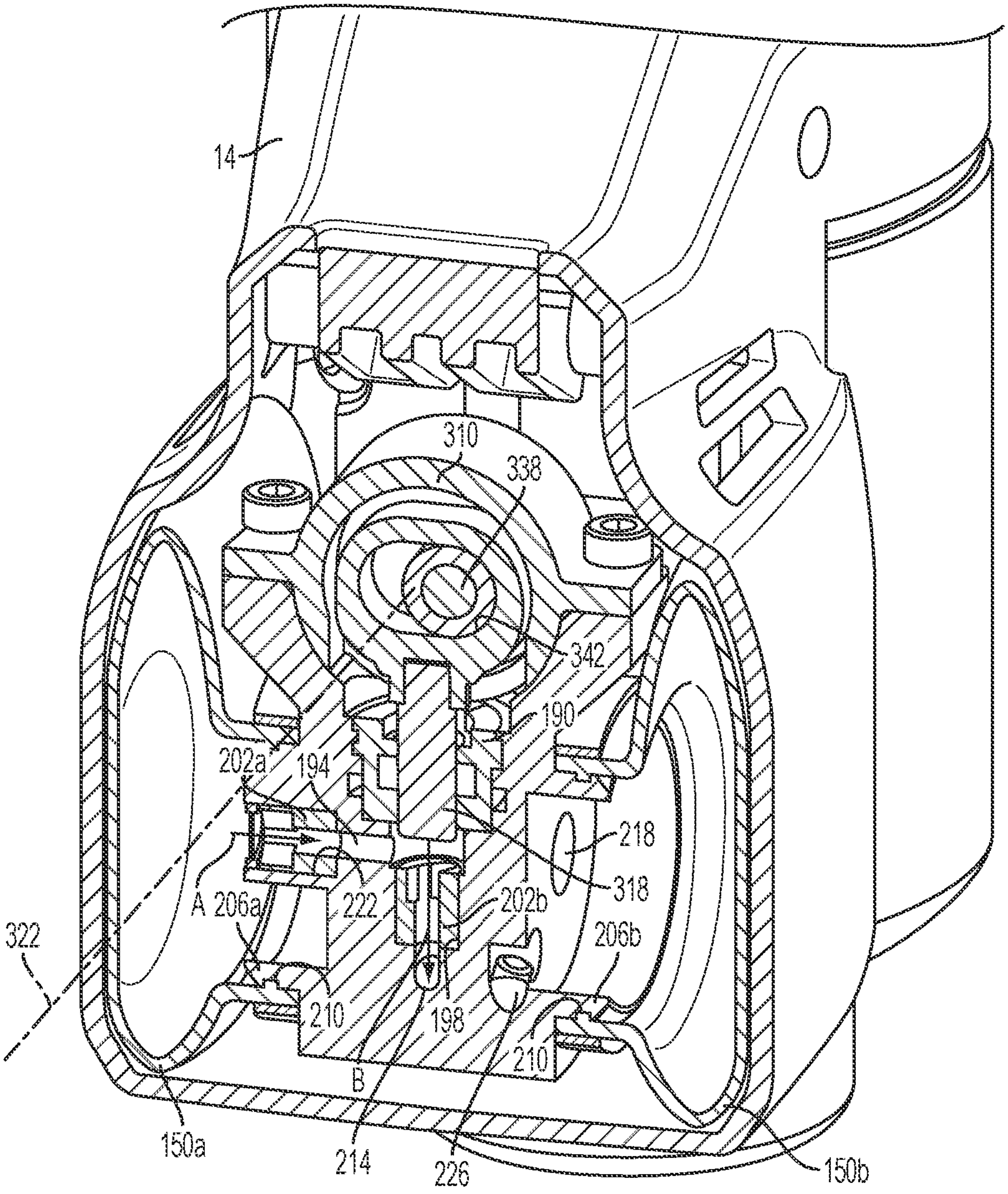
FIG. 12 is a section view of the knockout driver shown in FIG. 1, taken along line 13-13 of FIG. 2.

The piston cylinder 182 also includes an inlet 194 and an outlet 198 (FIG. 12). In the illustrated embodiment, the inlet 194 contains a check valve 202 *a* allowing fluid to only flow into the piston cylinder 182 (e.g., in direction A) while the outlet 198 contains a check valve 202 *b* allowing fluid to only flow from the piston cylinder 182 (e.g., in direction B). In the illustrated embodiment, each check valve 202 is a ball check valve, although in other embodiments, other types of check valve designs may be used.

The hydraulic block 166 also includes a first reservoir boss 206 *a* extending from a first side wall and a second reservoir boss 206 *b* extending from a second side wall opposite the first side wall. In the illustrated embodiment, each boss 206 *a*, 206 *b* is substantially circular and includes a groove 210 into which the corresponding reservoir bladder 150 *a*, 150 *b* can be attached.

The hydraulic block 166 also defines a plurality of hydraulic channels, each of which is drilled into or otherwise formed to provide fluid pathways between various areas of the head unit 18, the pump assembly 154 (when attached), and the reservoir 142. In the illustrated embodiment, the block 166 defines the first hydraulic channel 214 extending between and in fluid communication with the hydraulic aperture 170, the dump valve 230, and the outlet 198 or high pressure side of the pump 182 (FIG. 12). The block 166 also defines a cross channel 218 extending between and in fluid communication with the first and second reservoir bladders 150 *a*, 150 *b* and the outlet 298 of the dump valve 230 (described below). The block 166 also includes an inlet channel 222 extending between the first reservoir boss 206 *a* and the inlet 194 or low pressure side of the pump 182 (FIG. 12).

In the illustrated embodiment, the block 166 also includes a fill channel 226 extending between the second reservoir boss 206 *b* and the outside of the block 166 to allow the user to add or remove the hydraulic fluid in the reservoir 142. The fill channel 226 may also be used for mounting sensors (e.g., a pressure sensor, and the like) or be used as an accumulator to accommodate for changes in the hydraulic fluid level in addition to the reservoir bladders themselves.

Figure 6:
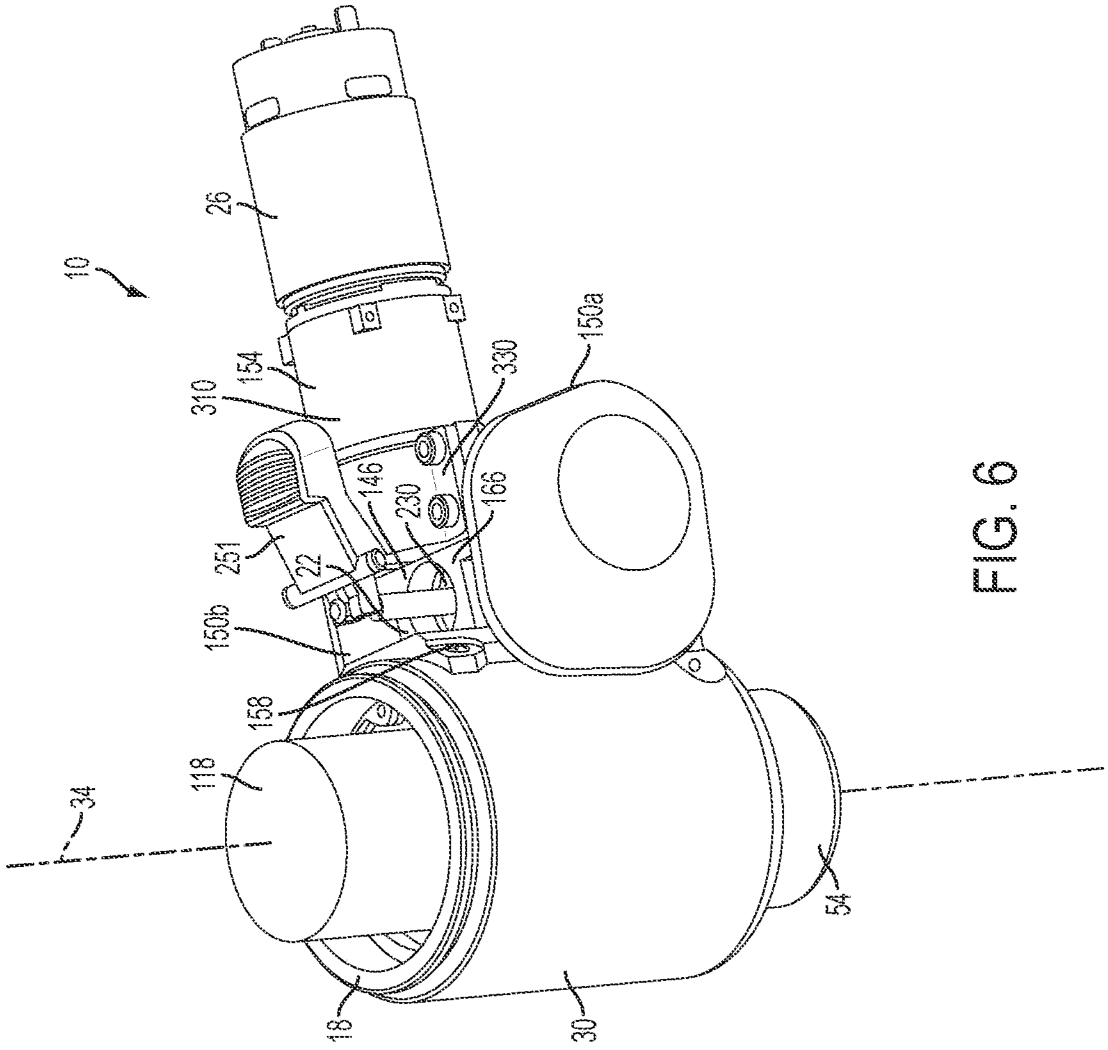
FIG. 6 is a perspective view of the knockout driver of FIG. 1 with the housing removed for clarity.

Illustrated in FIGS. 6, 7, and 12, the first and second reservoir bladders 150 *a*, 150 *b* are coupled to the first and second reservoir bosses 206 *a*, 206 *b*, respectively. Each reservoir bladder 150 *a*, 150 *b* defines at least a portion of the reservoir volume 142 of the driver 10. In the illustrated embodiment, each bladder 150 *a*, 150 *b* is formed from flexible yet fluid impermeable material such that each bladder can expand and contract to compensate for changes in the volume of fluid contained within the reservoir. More specifically, each reservoir is substantially flat in shape, being formed from two, slightly curved (e.g., domed) pieces of material attached along their peripheries. In the illustrated embodiment, each piece is substantially rectangular and includes rounded edges. When fluid is evacuated from the reservoir bladders 150 *a*, 150 *b*, the two pieces can collapse onto one another to drastically reduce the volume within the corresponding bladder.

As such, the reservoir bladders 150 *a*, 150 *b* are configured to allow a larger portion of the fluid contained within the bladders 150 *a*, 150 *b* to be used as working fluid. Stated differently, if a device requires 1 unit of fluid to operate (e.g., the working volume is 1 unit of fluid), the reservoir is designed to contain no greater than about 1.5 units of fluid. In another embodiment, the reservoir is designed to contain no more than about 1.4 units of fluid. In still another embodiment, the combined volume of the first reservoir bladder and the second reservoir bladder is designed to contain no more than about 1.1 units of volume. In another embodiment, the combined volume of the first reservoir bladder and the second reservoir bladder is designed to contain no more than about 1.011 units of fluid.

In the present invention, the working volume is defined as the volume of fluid that must be added to the work zone 78 (e.g., by the pump assembly 154) to move the working piston 110 from the rest position (FIG. 4) to the actuated position (FIG. 5). More specifically, in the illustrated embodiment 3.237 $in^3$ of fluid is added to the work zone 78 to move the working piston 110 from the rest position (FIG. 4) to the actuated position (FIG. 5). As such, a reservoir containing 1.347 units of fluid would contain 4.36 $in^3$ of fluid (3.237*1.347) while a reservoir containing 1.5 units of fluid would contain 4.856 $in^3$ of fluid (3.237*1.5).

The hydraulic assembly 22 also includes a dump valve 230 (FIGS. 10 and 11), positioned within a recess 234 formed in the hydraulic block 166 to provide selective fluid communication between the first hydraulic channel 214 (e.g., the work zone 78) and the cross channel 218 (e.g., the reservoir 142). The dump valve 230 includes a body 238, an activation rod 242, and a plunger 246. During operation, the dump valve 230 may be manually activated by the user (e.g., by pressing the return button 251) to return the piston 74 to the rest position. More specifically, once the dump valve 230 has been activated, the dump valve 230 is configured to remain in an open configuration (e.g., allowing fluid to flow from the work zone 78 to the reservoir 142) until the piston 74 reaches the rest position, at which time the dump valve 230 will enter a closed configuration (e.g., fluid is no longer able to flow between the work zone 78 and the reservoir 142). Furthermore, the dump valve 230 may be configured to automatically activate, for example when a predetermined pressure has been reached in the working volume 78 with respect to the reservoir 142, at which time the dump valve 230 will operate in the same manner as if it were activated manually.

Figure 10:
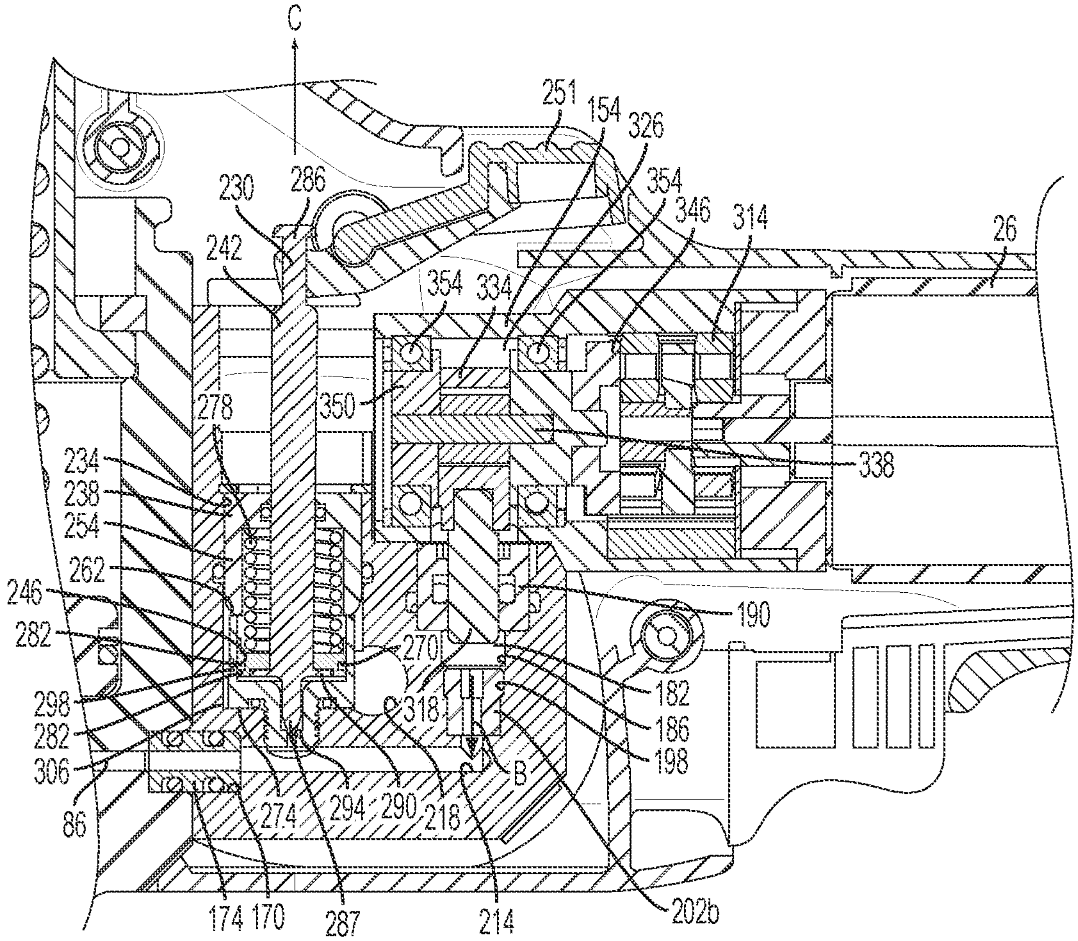
FIG. 10 is a detailed view of the knockout driver shown in FIG. 4, with a dump valve in a closed position.
Figure 11:
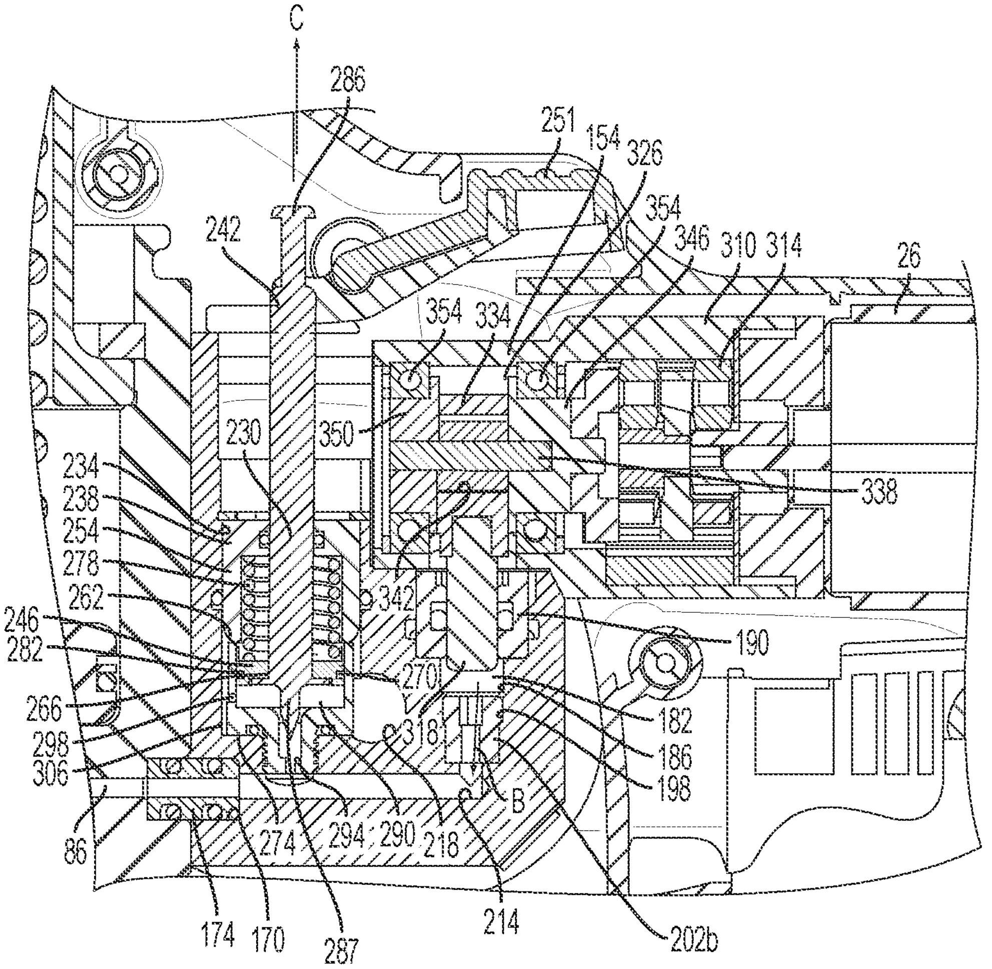
FIG. 11 is a detailed view of the knockout driver shown in FIG. 4, with the dump valve in an open position.

Illustrated in FIGS. 10 and 11, the body 238 of the dump valve 230 is at least partially positioned within the recess 234. The body 238 includes an annular side wall 254 extending axially into the recess 234 from a base wall 258 to produce a bottom edge 262. When assembled, the bottom edge 262 of the body 238 acts as a limiter, restricting the movement of the plunger 246 within the recess 234. The body 238 also defines an aperture in the base wall 258 to position the activation rod 242 within the recess 234.

The plunger 246 of the dump valve 230 is substantially disk shaped, and includes an aperture 266 proximate its center and defines an annular groove 270 along its perimeter. During operation, the plunger 246 moves axially along axis 231 within the recess 234 and along the actuation rod 242 between a first position (FIG. 10), where the plunger 246 is proximate the bottom 274 of the recess 234, and a second position (FIG. 11), where the plunger 246 is positioned a distance from the bottom 274 of the recess 234. In the illustrated embodiment, the plunger 246 is biased toward the first position by a spring 278. The plunger 246 also includes a flow control aperture 282 extending between a bottom of the plunger 246 and the annular groove 270 (FIG. 10).

Illustrated in FIG. 10, the activation rod 242 is substantially elongated in shape, having a knob or grip 286 proximate a first end, a needle point 287 proximate a second end, and a radially extending wall 290 proximate the second end. When assembled, the activation rod 242 extends through the apertures of the body 238 and the plunger 246, and is configured such that the radially extending wall 290 releasably engages the bottom of the plunger 246 while the needle point is configured to form a seal with a seat 294.

During operation, the dump valve 230 generally remains in the closed configuration where no fluid can flow between the first hydraulic channel 214 (e.g., the working volume 78) and the cross channel 218 (e.g., the reservoir 142). More specifically, when the dump valve 230 is in the closed configuration the spring 278 biases the plunger 246 toward the first position, which in turn causes the needle point 287 of the activation rod 242 to form a seal with the seat 294, sealing the recess 234 from the first hydraulic channel 214 (FIG. 10). In other embodiments, the activation rod 242 may bias a check ball (not shown) into the seat 294 to form a seal.

When the user wishes to return the piston 74 to the rest position, the user presses the return button 250, biasing the rod in a direction C along axis 231. As the activation rod 242 moves in the direction C, the radially extending wall 290 contacts the bottom of the plunger 246 biasing it in the first direction against the spring 278 and into the second position, leaving an output aperture 298 uncovered (FIG. 11). The movement of the activation rod 242 also causes the needle point 287 to separate from the seat 294 permitting fluid from the first hydraulic channel 214 to flow into the recess 234 and out the uncovered outlet aperture 298.

In the illustrated embodiment, the spring 278 is configured to produce a force that is sufficiently strong to keep the needle point 287 engaged with the seat 294 as pressure builds within the first hydraulic channel 214, but sufficiently weak to allow the plunger 246 to move toward the second position once the needle point 287 has been unseated. More specifically, it takes a first, smaller force to overcome the hydraulic pressure acting against the smaller surface area of the needle point 287 and a second, larger force to overcome the hydraulic pressure acting on the larger surface area of the plunger 246. As such, the spring 278 typically is preloaded to produce a force greater than the first, smaller force required for the needle point 287, but less than the second, larger force required for the plunger 246.

As the fluid leaves the work zone 78, the return spring 114 is able to bias the piston 74 toward the rest position. As the piston 74 moves toward the rest position, the pressure of the fluid within the recess 234 of the dump valve 230 is created by the energy stored within the return spring 114. As such, as the piston 74 continues to move toward the rest position, energy is released from the return spring 114 causing the pressure of the fluid in the dump valve 230 to drop. As the pressure of the fluid contained within the dump valve 230 drops, the plunger 246, biased by the spring 278, moves toward the first position.

Once the pressure within the volume has decreased to a given level, the plunger 246 will have moved to where it will begin to cover or block the outlet aperture 298. At this time, the aperture 298 becomes aligned with annular groove 270 forcing the working fluid to flow through the flow control aperture 282 formed in the bottom of the plunger 246. As this happens, a pressure differential is formed forcing the plunger 246 toward the first position and causing the needle point 287 to fully seal with the seat 294.

In the illustrated embodiment, the seat 294 of the dump valve 230 includes a flat contact surface with a generally vertical channel (FIGS. 10 and 11). However, in other embodiments, the seat may include a substantially conical contact surface to help direct the needle point 287 into the proper position (not shown).

Furthermore, the seat 294 has an outer diameter defining an axially extending wall that is less than the diameter of the recess 234, creating a gap 306 therebetween. During operation, fluid that flows out the outlet aperture 298 flows into the cross channel 218 via the gap 306.

Although the illustrated embodiment shows the head unit 18 permanently joined to the hydraulic body 146, in other embodiments, the head unit 18 may be detachable from the body 146. In still other embodiments, the head unit 18 may be rotatably or pivotably mounted to the body 146 to provide greater adaptability for tight or restricted working conditions.

Illustrated in FIGS. 10-12, the pump assembly 154 includes a pump drive housing 310, a gear drive 314, and a reciprocating piston 318 mounted within the piston cylinder 182. In the illustrated embodiment, the pump assembly 154 is a positive displacement design that receives hydraulic fluid from the reservoir 142 and pumps it, under pressure, into the work zone 78 to bias the piston 74 toward the actuated position.

Referring to FIGS. 4-7 and 10-12, the pump housing 310 is substantially cylindrical in shape, and defines a drive or motor axis 322 and an interior recess 326 substantially co-axial with the drive axis 322. When assembled, the drive axis 322 is substantially perpendicular to the pump axis 319 of the piston cylinder 182 of the hydraulic block 166. The pump housing 310 includes a mounting flange 330 (FIG. 6) to provide mounting apertures.

The pump housing 310 also includes mounting provisions (not shown) within the recess 326 to allow the instillation of the gear drive 314 and the motor 26. When assembled, the mounting provisions axially align the gear drive 314 and motor 26 with the drive axis 322.

Referring to FIGS. 10-12, the piston 318 of the pump assembly 154 is substantially cylindrical in shape and is sized to be received and move, along the pump axis 319 and within the piston cylinder 182 and sleeve 190 (when present). In some embodiments, the piston 318 may include a seal groove (not shown) to receive O-ring for sealing against the interior wall of the sleeve 190.

During operation of the pump assembly 154, the piston 318 moves (e.g., oscillates) along the pump axis 319 and within the piston cylinder 182 to alter the working volume therein; the working volume being defined as the volume within the piston cylinder 182 where the working fluid may be present. More specifically, when the piston 318 moves toward the distal end 186 of the piston cylinder 182, the working volume decreases, and when the piston 318 moves away from the distal end 186 of the piston cylinder 182, the working volume increases.

During operation, the torque provided by the motor 26 is transmitted to the piston 318 by way of a yoke 334. The motor 26 rotates the gear train 314, which in turn rotates an eccentrically positioned crank pin 338 (FIG. 12). The yoke 334 contains an elongated aperture 342 sized larger than the crank pin 338 so that eccentric rotation of the pin 338 causes the yoke 334 and piston 318 to reciprocate linearly as a unit. As such, the rotational motion of the motor 26 is converted into reciprocating motion of the piston 318.

More specifically, the crank pin 338 is supported between a first eccentric bushing 346 and a second eccentric bushing 350 (FIG. 10), each of which are supported by a respective bearing 354. As such, as the crank pin 338 rotates, it moves within the yoke's aperture 342 while also causing the yoke 334 to translate linearly up and down. In the illustrated embodiment, the crank pin 338 includes a bushing to reduce friction.

As the motor 26 rotates, the piston 318 oscillates within the piston cylinder 182 causing the working volume to increase and decrease in repetition. As such, each time the working volume increases, working fluid is drawn through the inlet 194 and into the piston cylinder 182. In contrast, each time the working volume begins to decrease, the fluid is forced out the outlet 198 and into the working volume 78.

Referring to FIGS. 13 and 14, to punch a hole in sheet material using the above described driver 10, a preliminary aperture 358 is drilled into a sheet material 362 and positioned proximate the center of the hole to be punched. A punch 366 and die 370 are placed on opposite sides of the sheet material 362, making sure the open, or cutting ends of both elements are facing the material to be cut (FIG. 13). A distal end 374 of the draw rod 378 is inserted through the die 370, through the preliminary aperture 358, and coupled to the punch 366 (e.g., by threading the distal end 374 of the draw rod 378 into the punch 366).

An opposing end 382 of the draw rod 378 is coupled to the piston 74 of the driver 10. The contact surface 58 of the driver 10 should rest against the die 370 and a user adjusts the position of the punch 366 so that the punch rests snuggly against the sheet material 362.

With the setup complete, the user activates the driver 10 by depressing the trigger 386 or other activation device (not shown), and thereby closing an electrical circuit and causing the motor 26 to produce torque. As the motor 26 rotates, the motor 26 causes the crank pin 338 to rotate eccentrically. As described above, eccentric rotation of the crank pin 338 is converted into linear, reciprocating motion of the piston 318 by way of the yoke 334. The reciprocating motion of the piston 318 within the piston cylinder 182 causes the pump assembly 154 to draw fluid from the reservoir 142 by way of the cross channel 218 and output fluid through the first hydraulic channel 214 and into the work zone 78. As the fluid accumulates within the work zone 78, the piston 74 is biased toward the actuated position, which in turn imparts tension on the draw rod 378.

As tension on the draw rod 378 increases (e.g., fluid continues to accumulate in the work zone 78), the punch 366 is drawn toward the die 370 until enough force is created to physically cut (e.g., punch) the sheet material 362 and create the desired aperture (FIG. 14).

With the hole created, the user can return the piston 74 to the rest position (e.g., reset the system) by actuating the dump valve 230 as described above. With the dump valve 230 activated, the fluid within the work zone 78 is evacuated to the reservoir 142 causing the piston 74 to return to the rest position. Once there, the dump valve 230 returns to the closed configuration.

In the instances where operating pressures within the work zone 78 exceed the pressure within the reservoir 142 beyond the predetermined value (e.g., the material is too thick, the punch is too large, or the piston 74 has reached the end of its travel limit), the dump valve 230 will automatically open, causing the piston 74 to return to the rest position as described above.

FIGS. 13 and 14 illustrate an anti-crash die 370. In the illustrated embodiment, the die depth DD (e.g., the depth a punch 366 can be inserted into the die) of the anti-crash die 370 is greater than the piston throw PT of the piston 74 (describe above). As such, the punch 366 cannot bottom out or contact the top wall 394 of the die 370 during use. More specifically, as the punch 366 is drawn toward the die 370 by the piston 74 during operation of the device, the piston 74 will reach the extent of its travel before the punch 366 reaches the top wall 394 of the die 370 (FIG. 14).

Figure 15:
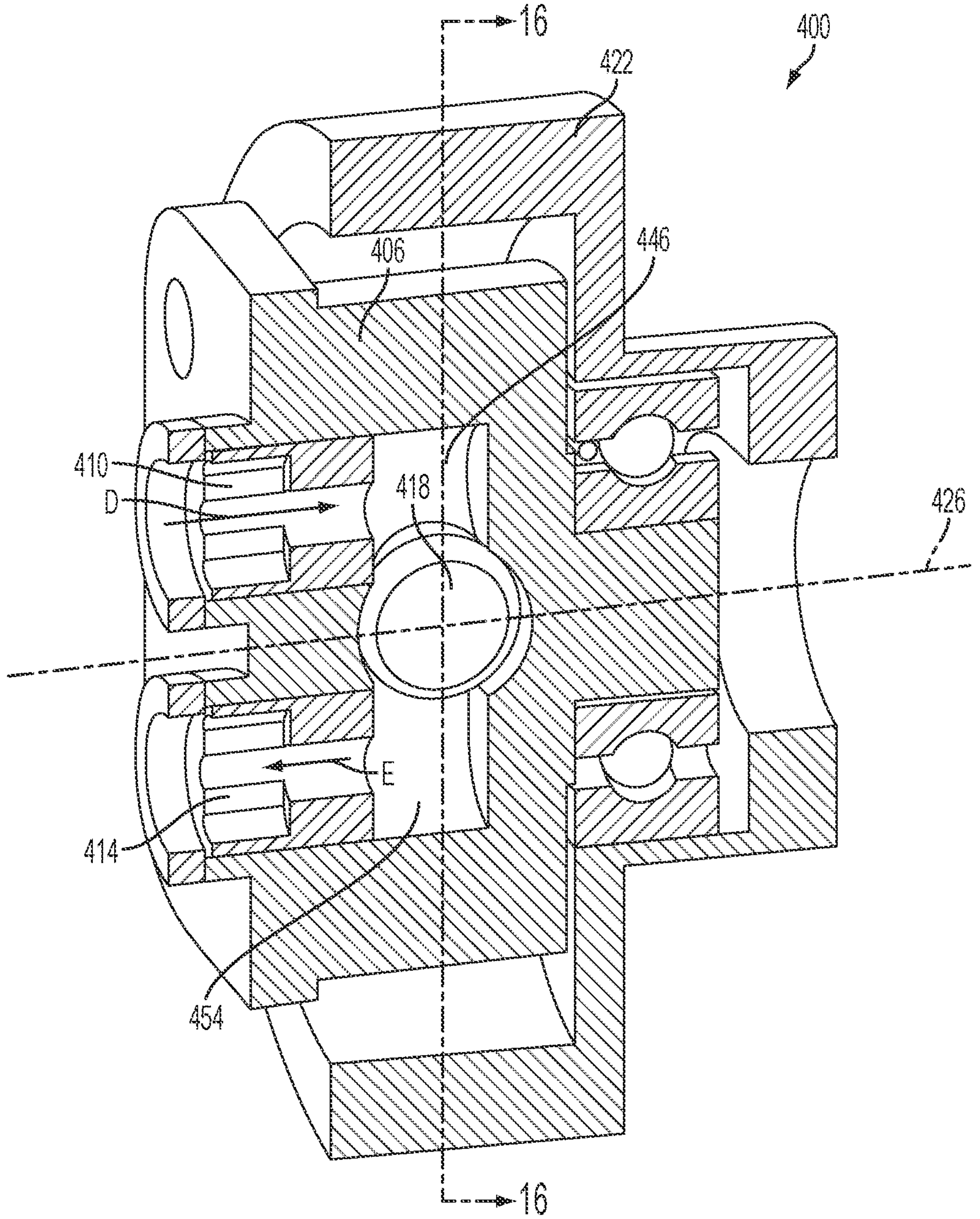
FIG. 15 illustrates another embodiment of a pump assembly sectioned along its midline.
Figure 17:
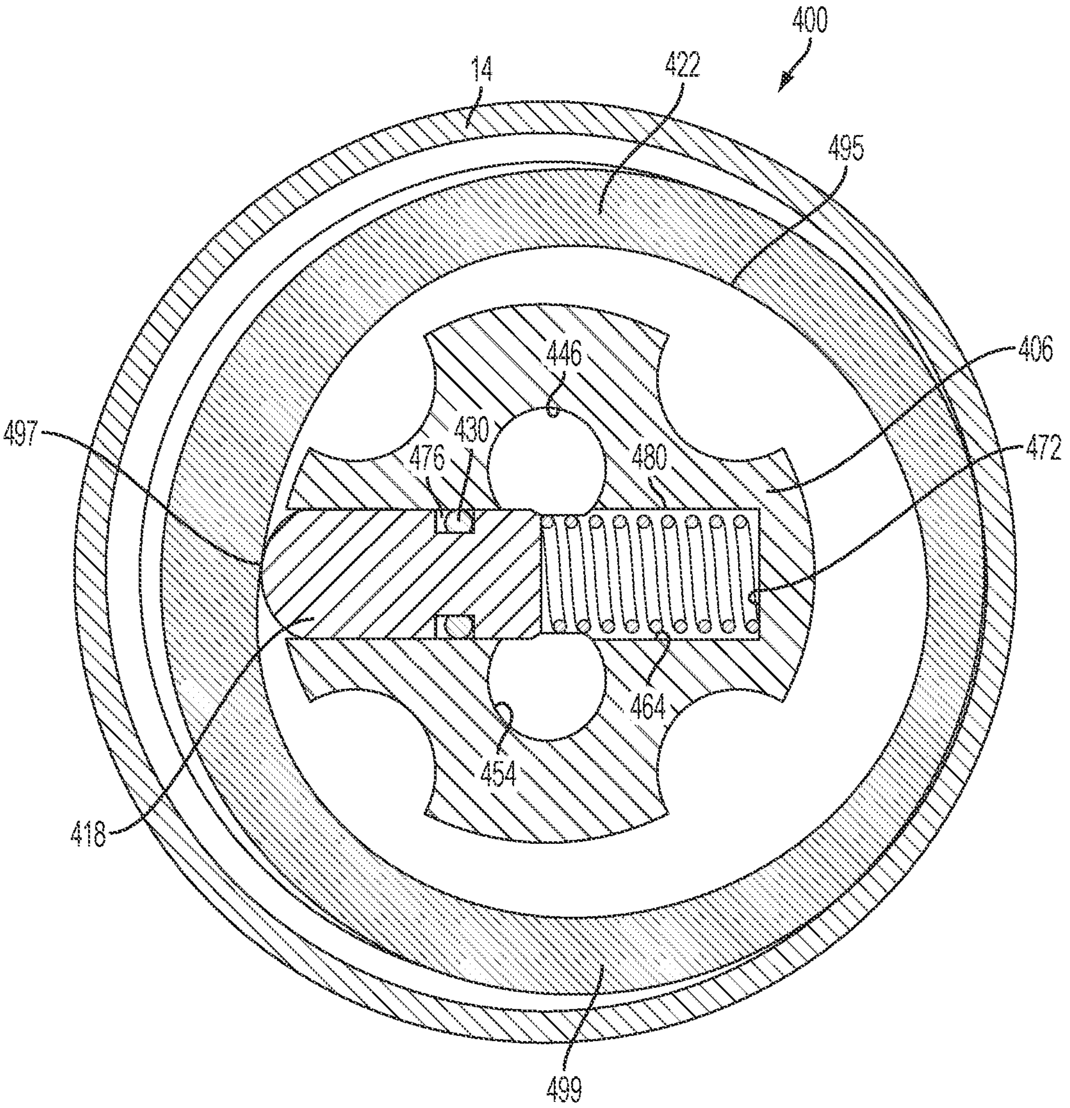
FIG. 17 is an end view of the pump assembly shown in FIG. 16.

FIGS. 15-17 illustrate an alternate embodiment of the pump assembly 400. The alternate pump assembly includes a pump housing 406, first and second check valves 410, 414, a piston 418, and a cam 422 rotatably mounted to the housing 406. Similar to the pump assembly 154 described above, the alternate pump assembly 400 is a positive displacement design that, when installed in a knockout punch driver, receives hydraulic fluid from the reservoir (not shown) and pumps it, under pressure, into the work zone (not shown) to bias the piston (not shown) toward the actuated position.

Referring to FIGS. 15 and 16, the pump housing 406 is substantially cylindrical in shape and defines a pump axis 426 therethrough. The pump housing 406 includes an inlet channel 446, in fluid communication with the reservoir, and an outlet channel 454, in fluid communication with the work volume.

The pump housing 496 also includes a piston cylinder 464 extending from a side wall 468 of the pump housing 406 that is substantially perpendicular the pump axis 426 to produce a distal end 472. In the illustrated embodiment, the piston cylinder 464 intersects and is in fluid communication with both the inlet channel 446 and the outlet channel 454 (FIG. 16).

Referring to FIG. 15, the first and second check valves 410, 414 are positioned within and control the flow of hydraulic fluid through the inlet channel 446 and outlet channel 454, respectively. The first check valve 410 is configured to only allow fluid to flow into the pump housing 406 (e.g., in direction D) while the second check valve 414 is configured to only allow fluid to flow out of the pump housing 406 (e.g., in direction E). In the illustrated embodiment, each check valve 410, 414 is a ball check valve, although in other embodiments, other types of check valve designs may be used.

Referring to FIGS. 15-17, the piston 418 of the pump assembly 400 is substantially cylindrical in shape and is sized to be received and move within the piston cylinder 464. The piston 418 includes a seal groove 476 sized to receive an O-ring 430 for sealing against the wall of the piston cylinder 464. The piston 418 also includes a radiused end to contact an interior cam surface 495 of the cam 422.

During operation of the pump assembly 400, the piston 418 moves (e.g., oscillates) within the piston cylinder 464 to alter the working volume of the pump housing 406; the working volume being defined as the volume within the pump housing 496 where hydraulic fluid may be present.

More specifically, when the piston 418 moves toward the distal end 472 of the piston cylinder 464, the working volume decreases, and when the piston 418 moves away from the distal end 472 of the piston cylinder 464, the working volume increases. The pump assembly 400 also includes a return spring 480 positioned within the piston cylinder 464 and extending between the distal end 472 and the piston 418 (FIG. 17). During operation, the return spring 480 biases the piston 418 away from the distal end 472 of the cylinder 464 and into engagement with the interior cam surface 495 of the cam 422.

Referring to FIGS. 13-15, the cam 422 is substantially cylindrical in shape and includes a cam wall 499 defining the interior cam surface 495. Best illustrated in FIG. 17, the interior cam surface 495 varies in radial distance from the pump axis 426 as it extends along the circumference of the cam wall 499.

During operation of the pump assembly 400, the cam 422 rotates with respect to the pump housing 406. As the cam 422 rotates, a point of contact 497 between the piston 418 and cam 422 moves circumferentially along the interior cam surface 295 varying the radial distance of the contact point 497 from the pump axis 426 in response to the contour of the cam wall 499. Variations in radial position of the contact point 497 cause the piston 497 to move within the piston cylinder 464, which changes the working volume of the pump housing 406.

More specifically, as the radial distance between the interior cam surface 495 and the pump axis 426 decreases, the piston 418 moves toward the distal end 472 of the piston cylinder 464 and the working volume decreases. In contrast, as the radial distance between the interior cam surface 495 and the pump axis 426 increases, the piston 418 moves away from the distal end 472 of the piston cylinder 464 (aided by the return spring 480) and the working volume increases. As such, the contour of the interior cam surface 495 may be altered to customize the speed and extent of the oscillating motion of the piston 418, and ultimately, the performance characteristics of the pump assembly 400.

As the cam 422 rotates, the piston 418 oscillates within the piston cylinder 464 (as described above) causing the working volume of the pump housing 406 to increase and decrease in repetition. As such, each time the working volume increases, working fluid is drawn through the first check valve 410, along the inlet channel 446, and into the piston cylinder 464. In contrast, each time the working volume begins to decrease, the fluid is forced out along the outlet channel 454 and through the second check valve 414.

In the above described configuration, direct contact with the interior cam surface 495 forces the piston 418 toward the distal end 472 (e.g., forcing the fluid out of the pump assembly 400), while the return spring is responsible biasing the piston 418 away from the distal end 472 (e.g., drawing the fluid into the pump assembly 400). This configuration is desirable since larger forces can be applied by the cam 422 (e.g., via the motor) than by the spring 480, thereby increasing the capabilities of the pump assembly 400. The above described pump stages are repeated as long as the cam 422 rotates.

Figure 18:
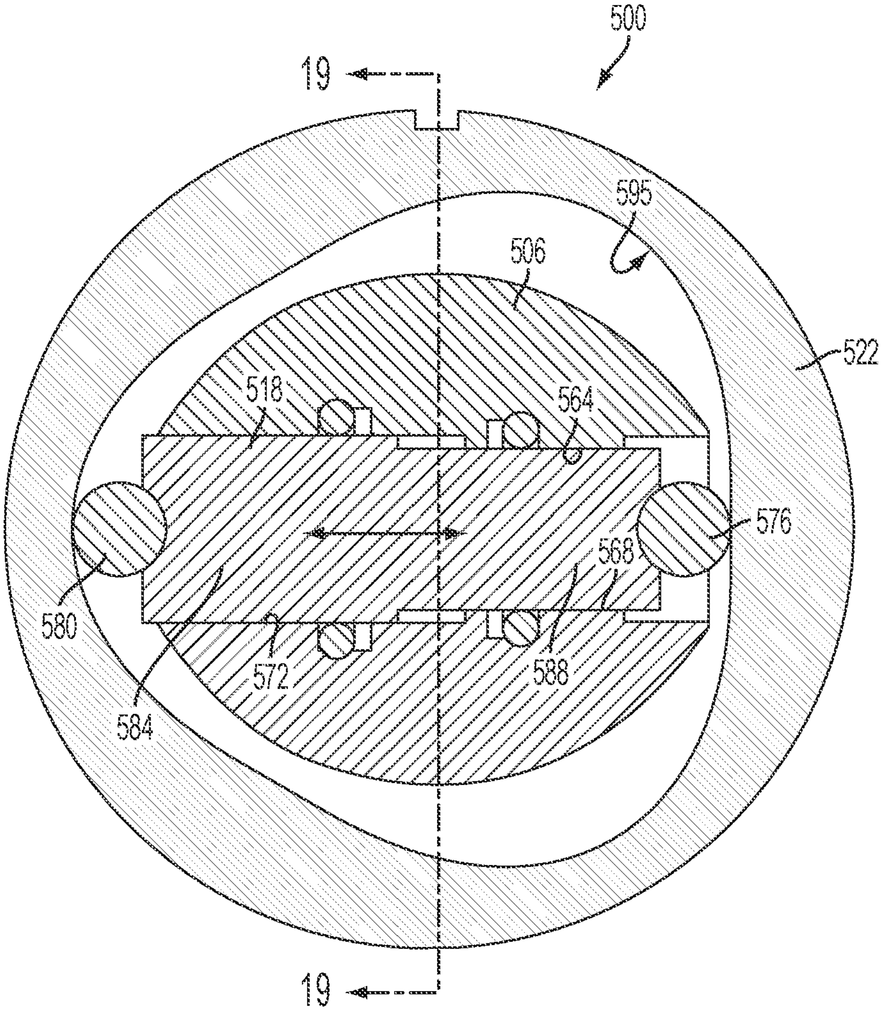
FIG. 18 illustrates another embodiment of a pump assembly sectioned along its midline.
Figure 19:
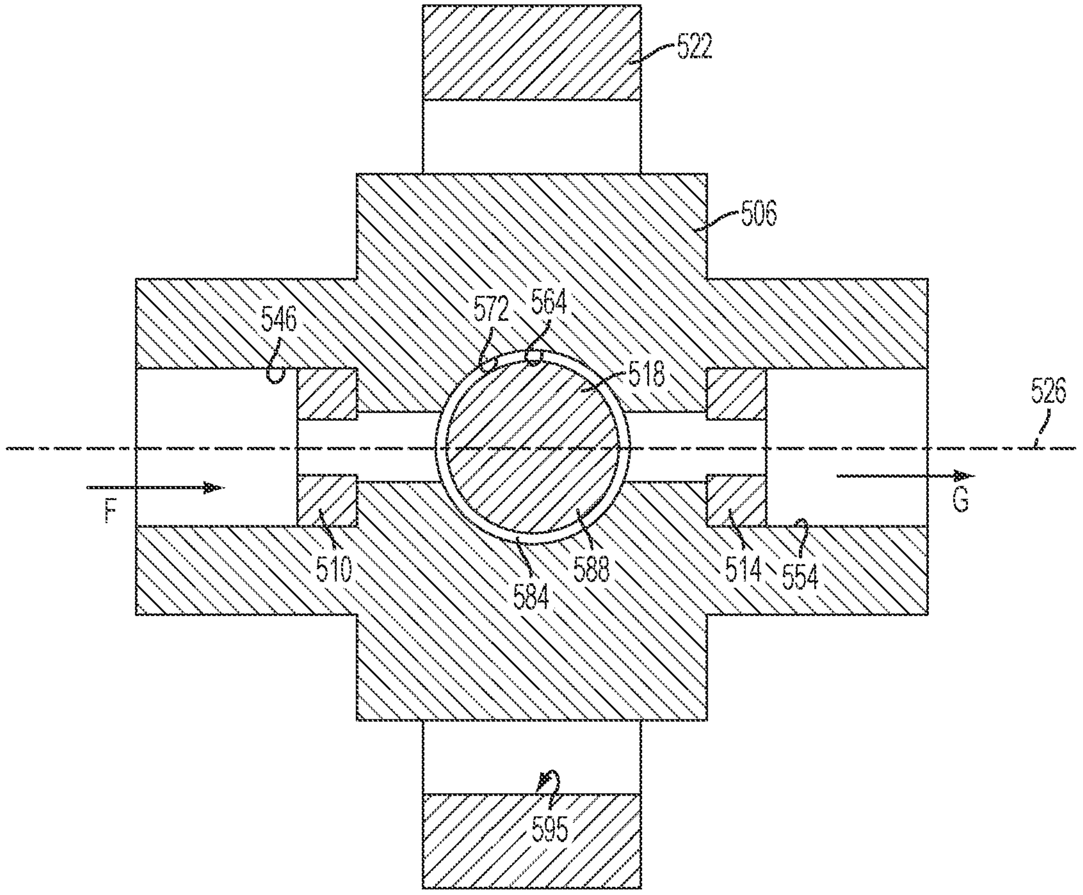
FIG. 19 is a section view taken along line 19-19 of FIG. 18.

FIGS. 18 and 19 illustrate another embodiment of the pump assembly 500. The alternate pump assembly 554 includes a pump housing 506, first and second check valves 510, 514, a piston 518, and a cam 522. Similar to the pump assembly 154 described above, the alternate pump assembly 500 is a positive displacement design that, when installed in a hand-held knockout punch driver, receives hydraulic fluid from the reservoir and pumps it, under pressure, into the work zone to bias the piston toward the actuated position.

Referring to FIGS. 18 and 19, the pump housing 506 is substantially cylindrical in shape and defines a pump axis 526 therethrough. The pump housing 506 includes an inlet channel 546, in fluid communication with the reservoir, and an outlet channel 554, in fluid communication with the work volume.

The pump housing 506 also includes a piston cylinder 564 extending through the housing substantially perpendicular the axis 526 and open on both ends. In the illustrated embodiment, the piston cylinder 564 includes a first portion 572 having a first diameter and a second portion 568 having a second diameter smaller than the first diameter. The piston cylinder 564 intersects and is in fluid communication with both the inlet channel 546 and the outlet channel 554 (FIG. 19).

Referring to FIG. 19, the first and second check valves 510, 514 are positioned within and control the flow of hydraulic fluid through the inlet channel 546 and outlet channel 554, respectively. The first check valve 510 is configured to only allow fluid to flow into the pump housing 506 (e.g., in direction F) while the second check valve 514 is configured to only allow fluid to flow out of the pump housing 506 (e.g., in direction G). In the illustrated embodiment, each check valve 510, 514 is a ball check valve, although in other embodiments, other types of check valve designs may be used.

Referring to FIGS. 18 and 19, the piston 518 is substantially cylindrical in shape having a first portion 584 matching the diameter of the first portion 572 of the piston cylinder 564 and a second portion 588 matching the diameter of the second portion 568 of the piston cylinder 564. The piston 518 also includes a pair of bearings 576, 580, positioned proximate both ends of the piston 518 and in contact with an interior cam surface 595 of the cam 522. In alternate embodiments, the piston 518 may contact the cam 522 directly.

During operation, the piston 518 moves (e.g., oscillates) within the piston cylinder 564 to alter the working volume of the pump housing 506; the working volume being defined as the volume within the pump housing 596 where hydraulic fluid may be present. More specifically, when the piston 518 moves to the left or toward first portion 572, the working volume increases, and when the piston 518 moves to the right or toward the second portion 568, the working volume decreases.

Referring to FIG. 18, the cam 522 is substantially cylindrical in shape and includes a cam surface 595. Best illustrated in FIG. 18, the interior cam surface 595 varies in radial distance from the pump axis 526 as it extends along the circumference of the cam 522. In the illustrated embodiment, any two opposing points on the cam surface 595 (e.g., situated 180 degrees apart) will be the same distance from one another to assure both bearings 576, 580 stay in contact with the cam surface 595 during operation. Furthermore, the illustrated cam surface 595 causes the piston 518 to oscillate multiple times (e.g., three) per single rotation of the cam 522. The diameter of the cam 522 also reduces the required torque per pressure generated by the pump 500.

During operation of the pump assembly 500, the cam 522 rotates with respect to the pump housing 506. As the cam 522 rotates, the bearings 576, 580, in contact with the cam surface 595, move along cam surface 595 as it varies in radial distance from the pump axis 526. As described above, variations in radial position of the contact points cause the piston 518 to move or reciprocate within the piston cylinder

564, which in turn causes the working volume of the pump housing 506 to vary. In the illustrated construction, both ends of the piston 518 contact the cam surface 595 so both directions of movement (e.g., to the right and to the left) are driven by the motor instead of relying on a return spring.

FIGS. 20-24 illustrate another embodiment of a powered knockout driver 10' according to another embodiment of the invention. The knockout driver 10' includes an attachment assembly 700' positioned between and releasably coupling a head unit 18' and a main housing 14'. The attachment assembly 700' includes a tool side attachment 704' coupled to the main housing 14' of the driver 10' and a pump side attachment 708' coupled to the pump assembly 22' of the head unit 18'.

Figure 22:
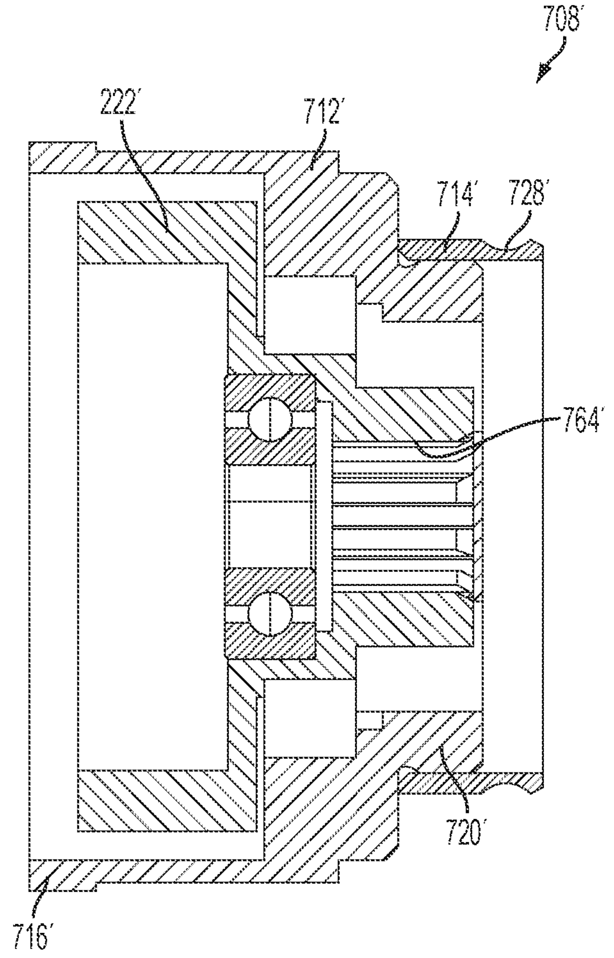
FIG. 22 illustrates the head unit attachment of the attachment assembly shown in FIG. 21.

Referring to FIG. 22, the pump side attachment 708' is coupled to (e.g., press fit) to the outer pump housing 712' and includes an outer pump housing 712' and an annular ring 714'. In the illustrated embodiment, the outer pump housing 712' substantially encompasses the cam 222' of the pump assembly 22', and includes a first end 716' coupled to the head unit 18' and a second end 720' opposite the first end 716', which is configured to engage the tool side attachment 704'. The second end 720' of the housing 712' includes a plurality of flats (not shown).

The ring 714' of the pump side attachment 708' is substantially annular in shape and includes a groove 728' extending circumferentially along the outer surface of the ring 714'. In the illustrated embodiment, the groove 728' extends radially inwardly to form a substantially radiused contour corresponding to the shape of locking balls 768' that are part of the tool side attachment 704' (described below).

Figure 20:
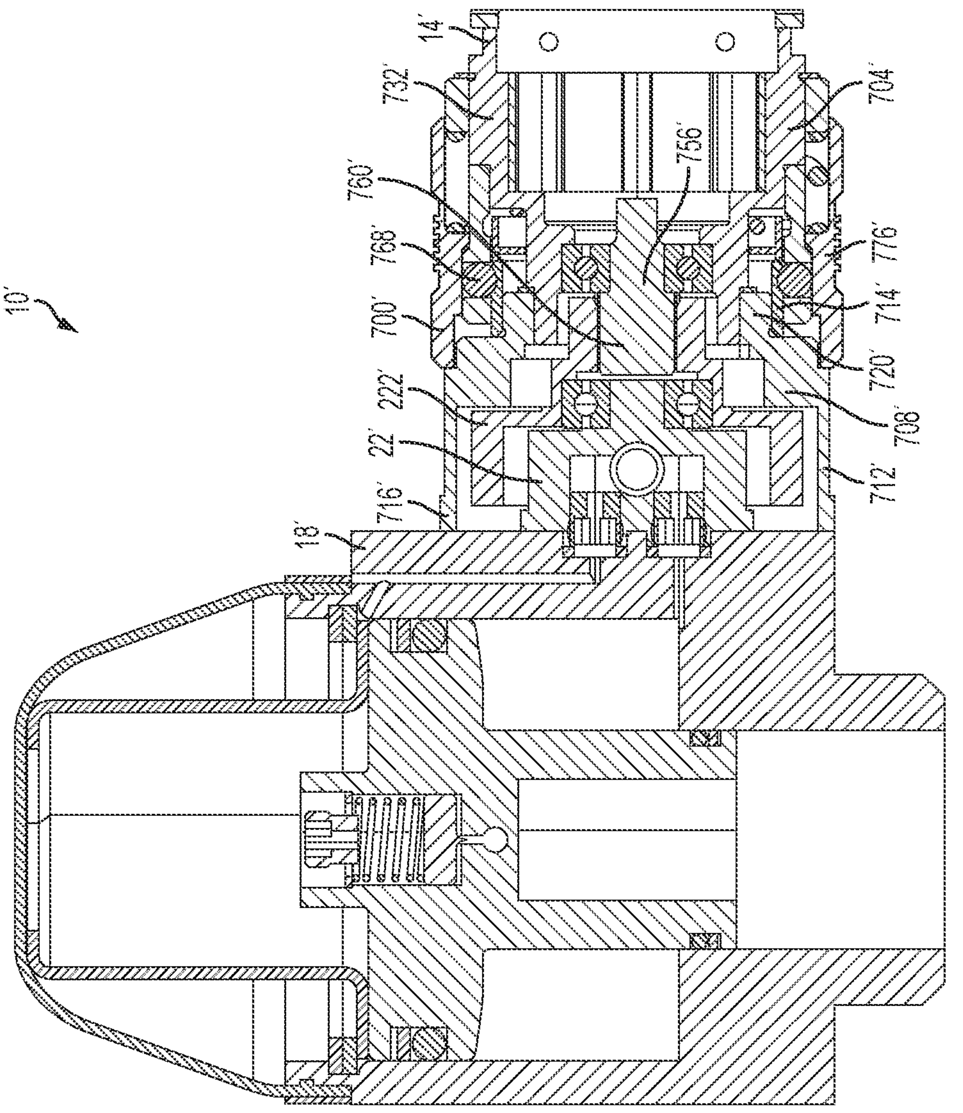
FIG. 20 illustrates another embodiment of a knockout driver sectioned along its midline.
Figure 21:
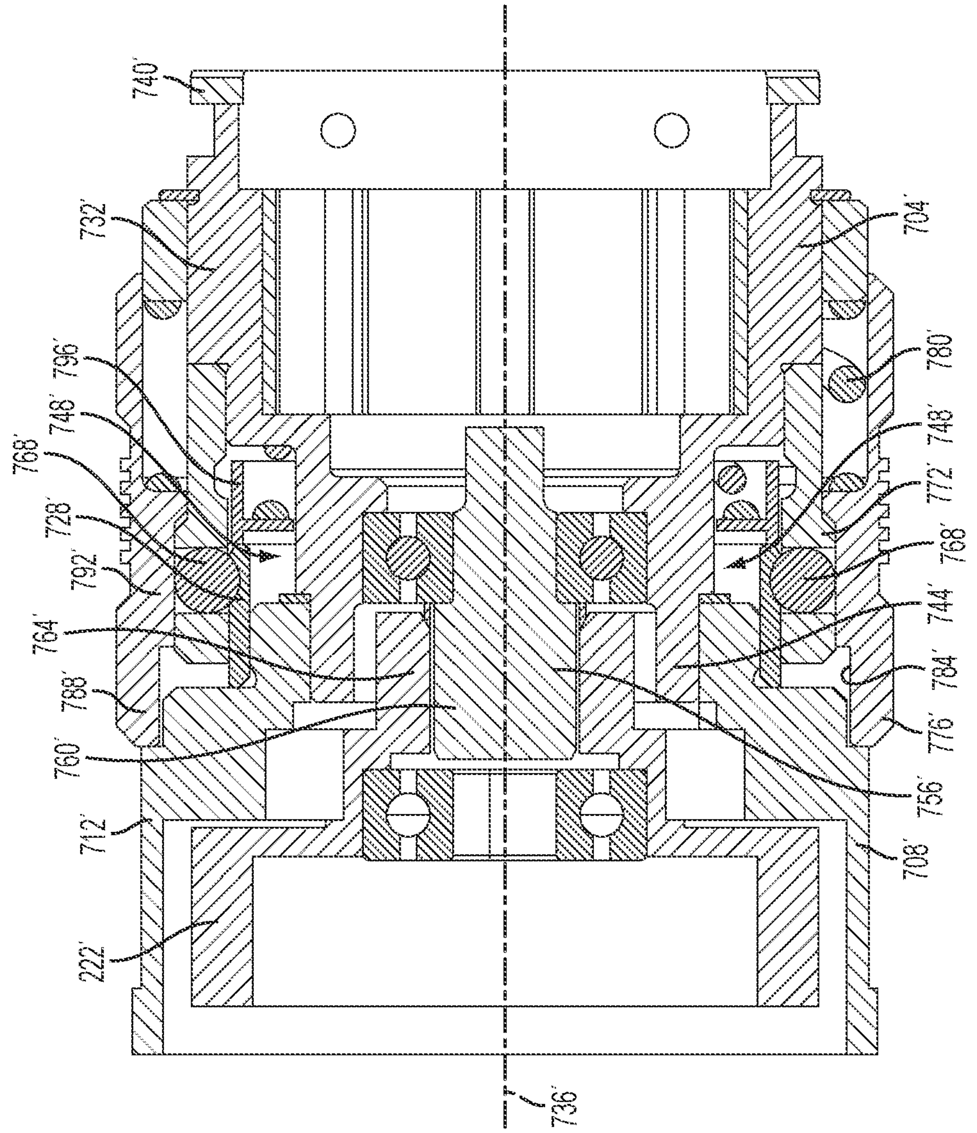
FIG. 21 illustrates the attachment assembly of the knockout driver shown in FIG. 20.
Figure 23:
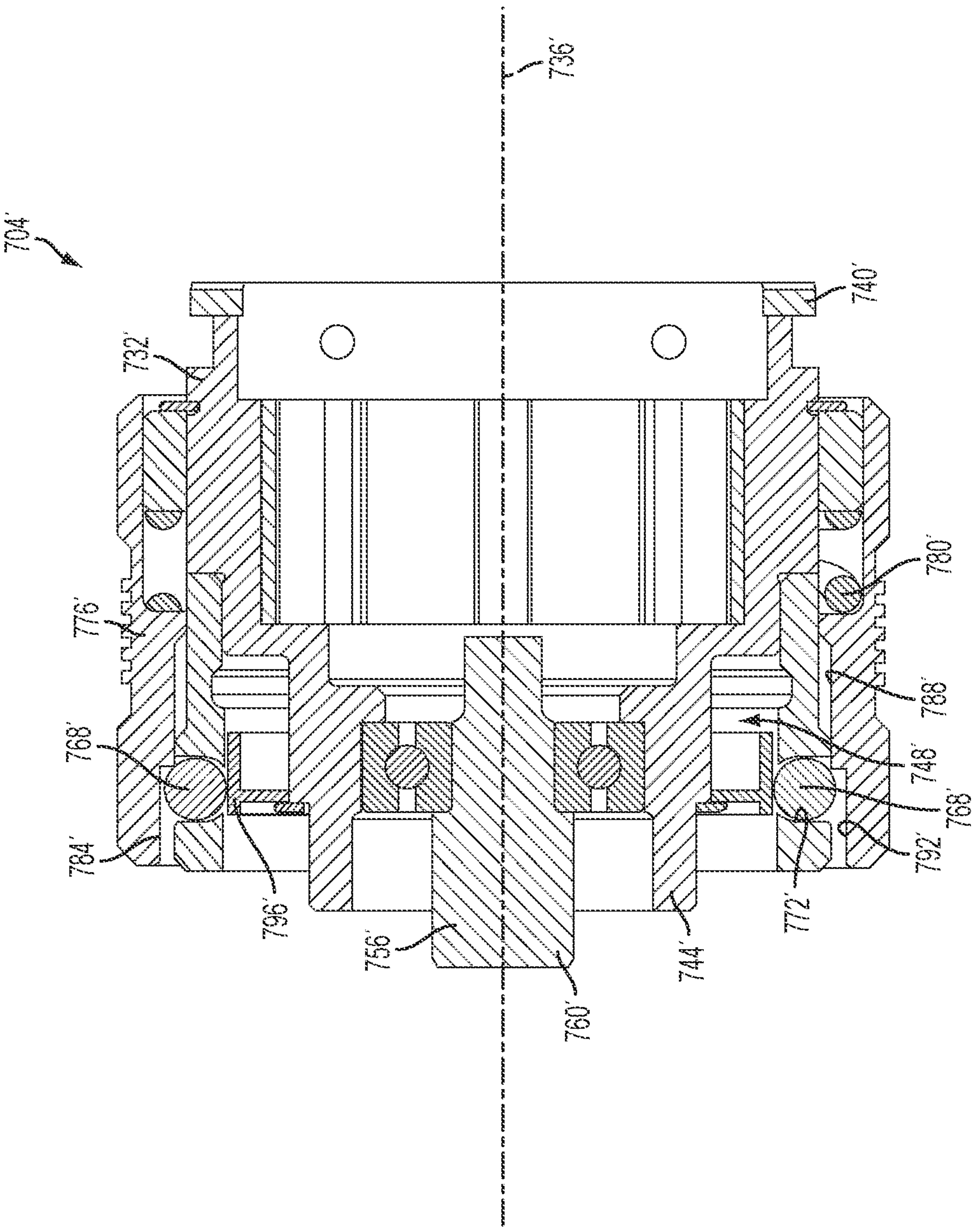
FIG. 23 illustrates the tool side attachment of the attachment assembly shown in FIG. 21.
Figure 24:
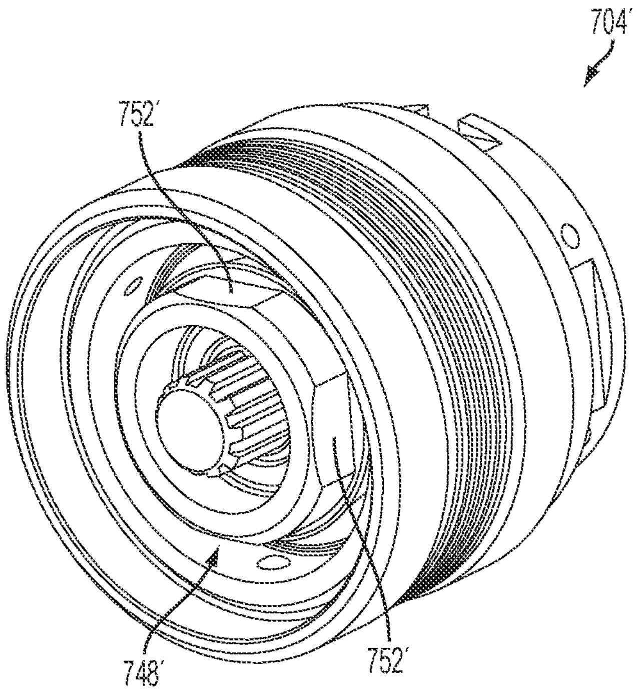
FIG. 24 is a perspective view of the attachment assembly shown in FIG. 21.

Best illustrated in FIG. 23, the tool side attachment 704' includes a substantially cylindrical body 732' defining an axis 736' therethrough. The cylindrical body 732' includes a first end 740' for coupling to the main housing 14' of the driver 10' and a second end 744' opposite the first end 740', which is configured to interact with the pump side attachment 708'. More specifically, the second end 744' of the attachment 704' includes a substantially annular channel 748' into which the ring 714' of the pump side attachment 708' is at least partially received and selectively retained (FIGS. 20 and 21).

The second end 744' also includes a plurality (e.g., four) of flats 752' (FIG. 24) formed by the body 732' and configured to substantially correspond with the flats of the outer housing 712'. In the illustrated embodiment, the flats 752' are positioned such that the head unit 18' may be attached to the main body 14' in various orientations. More specifically, the second end 744' includes four flats, spaced 90 degrees from one another, allowing the head unit 18' to be attached to the body 732' in four unique orientations. In other embodiments, fewer or more flats may be present to allow for fewer or more unique attachment orientations, respectively.

The tool side attachment 704' also includes an output shaft 756' rotatably coupled to the body 732' and driven by the motor 26'. When assembled, the output shaft 756' is configured to transmit torque between the motor 26' and the cam 222'. More specifically, the output shaft 756' includes a splined end 760' that, when the tool side attachment 704' is coupled to the pump side attachment 708', meshes with a splined portion 764' of the cam 222' to transmit torque therebetween.

The tool side attachment 704' also includes locking balls 768', which are spaced equally around the circumference of the body 732' and radially moveable between a radially inward or locked position (FIG. 21) and a radially outward or unlocked position (FIG. 23). When assembled, the locking balls 768' are at least partially received within the groove 728' of the pump side assembly 708', thereby locking the pump side assembly 708' to the tool side assembly 704'. In the illustrated embodiment, each locking ball 768' is positioned within an aperture 772' defined by the body 732' to limit the balls axial and circumferential movement while permitting it to move radially therein.

The tool side attachment 704' also includes a substantially annular locking collar 776'. The locking collar 776' is slideably coupled to the body 732', being axially moveable between a rested position (FIG. 21), and an actuated position (FIG. 23). In the illustrated embodiment, the collar 776' is biased into the rested position by a biasing member or spring 780'.

Referring to FIG. 23, an inner surface 784' of the locking collar 776' includes a first portion 792', which is positioned at a first radial distance from the axis 736', and a second portion 788', which is positioned at a second radial distance from the axis 736' that is greater than the first radial distance. During operation, the first portion 792' of the inner surface 784' is axially aligned with the locking balls 768' when the locking collar 776' is in the rested position (FIG. 21) and the second portion 788' of the inner surface 784' is axially aligned with the locking balls 768' when the locking collar 776' is in the actuated position (FIG. 34). As such, when the locking collar 776' is in the actuated position, the locking balls 768' are free to move radially between the locked and unlocked positions and when the locking collar 776' is in the rested position, the locking balls 768' are limited to the locked position. Moreover, if the locking balls 768' are unable to move radially inwardly into the locked position (e.g., because of the sleeve 796' is restricting such movement, described below), the locking collar 776' must remain in the actuated position until the locking balls 768' are free to move into the locked position.

The tool side attachment 704' also includes a sleeve 796' positioned within and axially moveable within the annular channel 748' between a rested position, wherein the sleeve 796' is axially aligned with the locking balls 768' (FIG. 34), and a biased position, wherein the sleeve 796' is not axially aligned with the locking balls 768' (FIG. 32). When the sleeve 796' is in the rested position, the sleeve blocks the locking balls 768' from moving radially inwardly into the locked position. Since the balls 768' are not able to move radially inwardly into the locked position, the locking collar 776' must remain in the actuated position as describe above.

To attach the head unit 18' to the main housing 14', a user first rotates the head unit 18' into the desired orientation with respect to the main hosing 14' making sure to align the flats of the outer housing 712' with the flats 752' of the body 732'. The user then axially introduces the ring 714' of the pump side attachment 708' into the annular channel 748' of the tool side assembly 704'.

As the user continues to axially introduce the ring 714' into the annular channel 748', the ring 714' contacts the sleeve 796', urging it out of axial alignment with the locking balls 768'. The user continues to introduce the ring 714' until the groove 728' of the ring 714' aligns with the locking balls 768', thereby allowing the locking balls 768' to move radially inwardly into engagement with the groove 728' and into the locked position. As a result, the locking collar 776' is able to move forward into the rested position, causing the first portion 792' of the inner surface 784' to become aligned with the locking balls 768' and maintaining the balls 768' in the locked position and securing the head unit 18' to the main housing 14'.

To remove the head unit 18' from the main housing 14', the user manually biases the locking collar 776' into the actuated position, causing the second portion 788' of the inner surface 784' to become aligned with the locking balls 768'. As a result, the locking balls 768' are free to move radially outwardly from the locked position and out of engagement with the groove 728' of the ring 714'. The user can then axially remove the pump side assembly 708' from the annular channel 748'. With the ring 714' removed, the sleeve 796' returns to the rested position (e.g., blocking the locking balls 768' from moving into the locked position) causing the locking collar 776' to remain in the actuated position, as described above.

Figure 25:
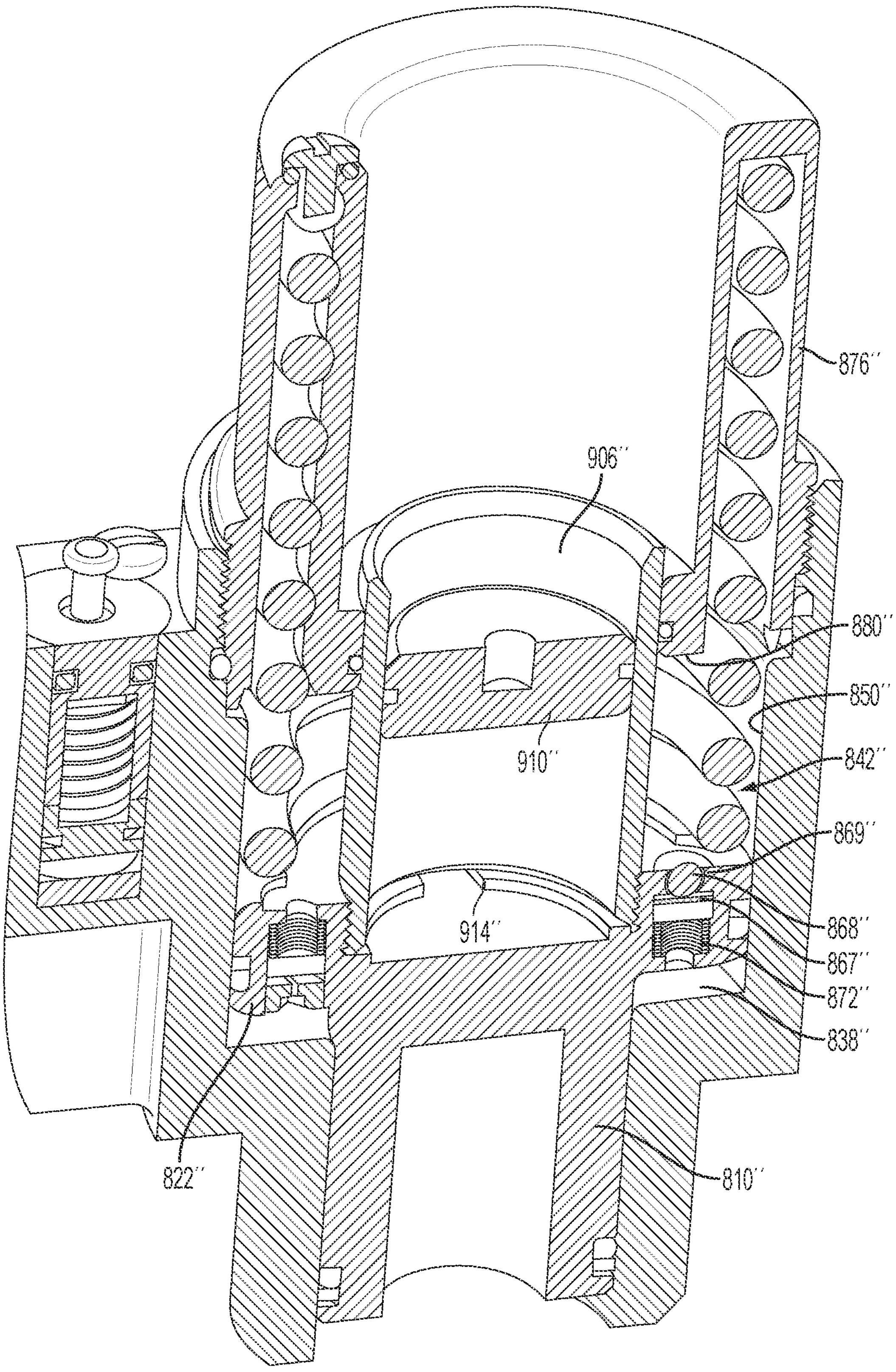
FIG. 25 illustrates another embodiment of a head unit sectioned along its midline.

FIG. 25 illustrates another embodiment of a head unit. The head unit defines a bore 850" therethrough and includes a piston 810" positioned and moveable within the bore 850". In the illustrated embodiment, the piston 810" at least partially separates the bore 850" between a work zone 838", positioned substantially below the flange 822", and a reservoir 842", positioned substantially above the flange 822".

The piston 810" also includes a travel limit poppet valve 867" for providing selective fluid communication between the work zone 838" and the reservoir 842", and which is at least partially dependent upon the position of the piston 810" within the bore 850" of the head unit. More specifically, the travel limit poppet valve 867" is configured to open, or allow the flow of fluid between the work zone 838" and the reservoir 850", when the piston 810" has reached a predetermined travel limit within the bore 850".

Illustrated in FIG. 25, the travel limit poppet valve 867" is positioned within the flange 822" of the piston 810" and includes a check ball 868" extending slightly beyond the top of the piston 810" that is biased against a seal 869" by a spring 872". During operation, when the piston 810" reaches the pre-determined travel limit the check ball 868" contacts a limiter 880" (e.g., the bottom of a retainer cup 876") and is biased away from and out of engagement with the seal 869" thereby allowing fluid to flow between the work zone 838" and the reservoir 842". This in turn limits or restricts the movement of the piston 810" within the bore 850" and stops the user from over traveling the piston 810". In some embodiments, the limiter may be adjustable to change the position at which the valve 867" will be opened and the movement of the piston 810" restricted.

The head unit 18" also includes a fill tube 906" coupled to the piston 810" and in fluid communication with the reservoir 842". In the illustrated embodiment, the fill tube 906" moves with the piston 810" and includes a plunger 910" positioned within and axially moveable within the fill tube 906". When assembled, the volume produced by the fill tube 906" and plunger 910" is in fluid communication with the reservoir 842" via a set of notches 914" cut into the piston 810". As such, any variations in fluid level of the reservoir 842" (e.g., via movement of the piston 810" within the bore 850" or working fluid temperature changes) will bias the plunger 910" axially along the tube 906" to compensate. More specifically, if the volume of fluid within the reservoir 842" increases, the plunger 910" will move toward the open end of the tube 906", while if the volume of fluid within the reservoir 842" decreases, the plunger 910" will move toward the piston 810". In the illustrated construction, the piston 810" moves within the fill tube 906" by way of hydraulic forces only; however in alternate constructions, additional forces may be employed (e.g., via springs, stops, check valves, and the like).

Furthermore, if the fluid level within the reservoir 842" exceeds a maximum allowable limit, the plunger 910" can eject from the far end of the fill tube 906" allowing the excess fluid to drain harmlessly. In situations where the plunger 910" is ejected, all the user must do to resume working with the head unit 18" is top off the any working fluid that may have been lost and re-insert the plunger 910" in the fill tube 906" via the open portion of the retainer cup 876", no replacement parts are needed. In some embodiments, a rod or handle (not shown) may be attached to the plunger 910" so the user can manually remove the plunger 910" from the tube 906".

Although the invention has been described in detail with reference to certain preferred embodiments, variations and modifications exist within the scope and spirit of one or more independent aspects of the invention as described.

The invention claimed is:

1. A hand-held knockout driver comprising:
- a housing having a handle portion;
- a head unit defining a first hydraulic channel;
- a pump body coupled to the head unit, the pump body defining a second hydraulic channel; and
- an insert having a first end sized to be at least partially received within and form a seal with the first hydraulic channel and a second end sized to be at least partially received within and form a seal with the second hydraulic channel.

2. The hand-held knockout driver of claim 1, wherein the insert includes an O-ring.

3. The hand-held knockout driver of claim 1, wherein the insert defines a third hydraulic channel extending therethrough.

4. The hand-held knockout driver of claim 3, wherein the third hydraulic channel fluidly couples the first hydraulic channel to the second hydraulic channel.

5. The hand-held knockout driver of claim 1, wherein the head unit includes a working piston moveable between a rest position and an actuated position to define a piston throw distance therebetween.

6. The hand-held knockout driver of claim 5, further comprising:
- a draw stud coupled to the working piston;
- a die coupled to the head unit; and
- a punch coupled to the draw stud opposite the working piston for movement therewith relative to the die;
- wherein the die has a depth greater than the piston throw distance.

7. The hand-held knockout driver of claim 1, wherein the pump body defines a recess.

8. The hand-held knockout driver of claim 7, further comprising:
- a dump valve positioned within the recess and having a seat, a piston, a plunger, and a return spring.

9. The hand-held knockout driver of claim 8, wherein the seat includes a side wall defining and output aperture, and wherein the side wall is spaced radially inwardly from an interior surface of the recess.

10. The hand-held knockout driver of claim 1, wherein the insert is substantially cylindrical.

* * * * *